(12) United States Patent
Katagiri et al.

(10) Patent No.: US 12,086,303 B2
(45) Date of Patent: Sep. 10, 2024

(54) ELECTRONIC APPARATUS AND MODE CONTROL PROGRAM

(71) Applicant: Sony Group Corporation, Tokyo (JP)

(72) Inventors: Yoichi Katagiri, Tokyo (JP); Masatoshi Hino, Tokyo (JP); Hidenari Shinotou, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 18/044,576

(22) PCT Filed: Sep. 9, 2021

(86) PCT No.: PCT/JP2021/033110
§ 371 (c)(1),
(2) Date: Mar. 9, 2023

(87) PCT Pub. No.: WO2022/059585
PCT Pub. Date: Mar. 24, 2022

(65) Prior Publication Data
US 2023/0376105 A1 Nov. 23, 2023

(30) Foreign Application Priority Data
Sep. 18, 2020 (JP) ................................. 2020-156904

(51) Int. Cl.
*G06F 3/01* (2006.01)
*G01K 13/20* (2021.01)
(Continued)

(52) U.S. Cl.
CPC ............ *G06F 3/011* (2013.01); *G01K 13/223* (2021.01)

(58) Field of Classification Search
CPC ............ G06F 4/041; G06F 3/044; G06F 1/20
See application file for complete search history.

(56) References Cited

U.S. PATENT DOCUMENTS

| | | | |
|---|---|---|---|
| 8,989,792 B1 * | 3/2015 | Depew | H04B 1/3838 455/575.4 |
| 9,823,746 B2 * | 11/2017 | Kim | G06F 1/16 |

(Continued)

FOREIGN PATENT DOCUMENTS

| | | |
|---|---|---|
| JP | 2002-300050 A | 10/2002 |
| JP | 2007-043422 A | 2/2007 |

(Continued)

OTHER PUBLICATIONS

International Search Report and Written Opinion mailed on Nov. 9, 2021, received for PCT Application PCT/JP2021/033110, filed on Sep. 9, 2021, 9 pages including English Translation.

*Primary Examiner* — Sepehr Azari
(74) *Attorney, Agent, or Firm* — XSENSUS LLP

(57) ABSTRACT

[Object] To achieve the high performance of an electronic apparatus and ensure the safety of a user at the same time. [Solving Means] An electronic apparatus includes a temperature sensor that detects a temperature of a specified portion of the electronic apparatus; and a mode controller that turns on an endurance mode that is a mode that permits a surface temperature of the electronic apparatus to be increased to a second upper limit when the electronic apparatus is used out of contact with a human body, the surface temperature being calculated on the basis of the temperature detected by the temperature sensor, the second upper limit being higher than a first upper limit that is an upper limit of a temperature in a normal mode.

20 Claims, 14 Drawing Sheets

(51) Int. Cl.
  *G06F 1/20*     (2006.01)
  *G06F 1/3231*   (2019.01)

(56) References Cited

U.S. PATENT DOCUMENTS

| | | | | |
|---|---|---|---|---|
| 11,316,971 | B2* | 4/2022 | Guo | H04W 52/0251 |
| 2009/0259348 | A1* | 10/2009 | Syu | G06F 1/206 |
| | | | | 700/300 |
| 2011/0251733 | A1* | 10/2011 | Atkinson | G06F 1/3203 |
| | | | | 700/300 |
| 2014/0055623 | A1* | 2/2014 | Okada | H04N 23/634 |
| | | | | 348/177 |
| 2014/0236380 | A1* | 8/2014 | Alton | G06F 1/206 |
| | | | | 700/299 |
| 2015/0192994 | A1* | 7/2015 | Kim | G06F 3/014 |
| | | | | 340/5.53 |
| 2015/0331462 | A1* | 11/2015 | Atkinson | G06F 1/324 |
| | | | | 713/100 |
| 2016/0065723 | A1* | 3/2016 | Jung | H04W 52/0251 |
| | | | | 340/586 |
| 2016/0116952 | A1* | 4/2016 | Lee | G06F 3/0346 |
| | | | | 700/299 |
| 2017/0265141 | A1* | 9/2017 | Yang | G06F 1/329 |
| 2018/0181171 | A1* | 6/2018 | Jang | G01K 7/427 |
| 2019/0035234 | A1* | 1/2019 | Howard | G08B 6/00 |
| 2019/0272020 | A1* | 9/2019 | Woo | G06F 1/1677 |
| 2021/0255746 | A1* | 8/2021 | Hu | H04N 23/667 |
| 2021/0350952 | A1* | 11/2021 | Singh | H01B 7/421 |
| 2023/0328168 | A1* | 10/2023 | Huang | G06F 1/20 |

FOREIGN PATENT DOCUMENTS

| | | |
|---|---|---|
| JP | 2007-074095 A | 3/2007 |
| JP | 2007-166500 A | 6/2007 |
| JP | 2009-089039 A | 4/2009 |
| JP | 2010-124246 A | 6/2010 |
| JP | 2014-212594 A | 11/2014 |
| JP | 2015184792     | 10/2015 |
| JP | 2015226177     | 12/2015 |
| JP | 2017-060009 A | 3/2017 |

* cited by examiner

ELECTRONIC APPARATUS AND MODE CONTROL PROGRAM

CROSS-REFERENCE TO RELATED APPLICATIONS

The present application is based on PCT filing PCT/JP2021/033110, filed Sep. 9, 2021, which claims priority to Japanese Application No. 2020-156904, filed Sep. 18, 2020, the entire contents of each are incorporated herein by reference.

TECHNICAL FIELD

The present disclosure relates to an electronic apparatus such as a mobile device, and a mode control program that is executed by the electronic apparatus.

BACKGROUND ART

Electronic apparatuses such as mobile devices including smartphones and tablet computers have exhibited a higher performance and have been used for various purposes. This may cause an increase in surface temperatures of the electronic apparatuses.

CITATION LIST

Patent Literature

Patent Literature 1: Japanese Patent Application Laid-open No. 2007-43422
Patent Literature 2: Japanese Patent Application Laid-open No. 2007-74095
Patent Literature 3: Japanese Patent Application Laid-open No. 2009-89039
Patent Literature 4: Japanese Patent Application Laid-open No. 2014-212594

DISCLOSURE OF INVENTION

Technical Problem

Depending on the function performed by an electronic apparatus, a surface temperature of the electronic apparatus may be increased to a temperature that could burn a user. Thus, there is a need to control (relax) an upper limit of the surface temperature of the electronic apparatus to the extent that a user is unlikely to get burned, in order to ensure the safety of the user. Typically, the performance of the electronic apparatus is reduced to perform control (relaxing) such that the surface temperature of the electronic apparatus does not exceed the upper limit.

In view of the circumstances described above, it is an object of the present disclosure to achieve the high performance of an electronic apparatus and ensure the safety of a user at the same time.

Solution to Problem

An electronic apparatus according to an embodiment of the present disclosure includes
a temperature sensor that detects a temperature of a specified portion of the electronic apparatus; and
a mode controller that turns on an endurance mode that is a mode that permits a surface temperature of the electronic apparatus to be increased to a second upper limit when the electronic apparatus is used out of contact with a human body, the surface temperature being calculated on the basis of the temperature detected by the temperature sensor, the second upper limit being higher than a first upper limit that is an upper limit of a temperature in a normal mode.

The present embodiment permits the surface temperature of the electronic apparatus to be increased to a temperature in (or an upper limit of) a temperature range of low-temperature burn (the endurance mode) when the electronic apparatus is used out of contact with a human body. This results in maintaining (not reducing) a level of performance of the electronic apparatus. This makes it possible to achieve the high performance of the electronic apparatus and ensure the safety of a user at the same time.

The electronic apparatus further includes a cable interface, and
when a cable is inserted into the cable interface, the mode controller determines that the electronic apparatus is going to be used out of contact with a human body.

Depending on the function performed by the electronic apparatus, the surface temperature may be increased to a temperature that is higher than normal. Specific examples of such a function include 5G communication that is performed through a USB cable using tethering, and real-time display of a high-quality moving image that is received through an HDMI (registered trademark) cable. In the use of these functions, the electronic apparatus may be used out of contact with a human body. When a function that could increase the surface temperature to a temperature that is higher than normal is performed in a state in which the electronic apparatus is used out of contact with a human body, the endurance mode is turned on. This makes it possible to achieve the high performance of the electronic apparatus and ensure the safety of a user at the same time.

In response to turning on the endurance mode, the mode controller outputs a start inquiry message that is a message used to inquire whether to consent to start the endurance mode,
when the consent is input, the mode controller starts the endurance mode, and
when the consent is not input, the mode controller turns off the endurance mode.

A consent of a user is obtained at a timing of turning on the endurance mode, and this makes it possible to ensure the safety of the user more certainly.

When the surface temperature exceeds the first upper limit in a state in which the endurance mode is on, the mode controller outputs a maintenance inquiry message that is a message used to inquire whether to consent to maintain the endurance mode,
when the consent is input, the mode controller maintains the endurance mode, and
when the consent is not input, the mode controller turns off the endurance mode.

A consent of a user is obtained at a timing at which the surface temperature has reached a lower limit of the temperature range of low-temperature burn, and this makes it possible to ensure the safety of the user more certainly. Further, the endurance mode is turned off when the consent is not input (including the case of a time-out), and this makes it possible to ensure the safety of the user. This makes it possible to prevent the user from getting burned by touching the electronic apparatus without being aware that the surface temperature is increased to be in the temperature range of low-temperature burn before the user becomes aware of the maintenance inquiry message.

When the surface temperature has reached, before the consent is input, a specific temperature greater than the first upper limit in the state in which the endurance mode is on, the mode controller turns off the endurance mode.

A state in which the surface temperature has reached the specific temperature refers to a state in which the surface temperature has actually been increased to a temperature that could suddenly cause a low-temperature burn for a short contact time, even though a user still believes that the electronic apparatus has a safe surface temperature. It is dangerous to touch the electronic apparatus without being aware of such an increase in the surface temperature. Thus, the endurance mode is turned off when the surface temperature has reached the specific temperature, and this makes it possible to ensure the safety of the user.

When the mode controller maintains the endurance mode in response to the consent being input, the mode controller periodically outputs the maintenance inquiry message while the surface temperature is greater than the first upper limit and is equal to or less than the second upper limit,
when the consent is input, the mode controller maintains the endurance mode, and
when the consent is not input, the mode controller turns off the endurance mode.

While the surface temperature is in the temperature range of low-temperature burn, dangers are often caused to be well known and taught to a user and a consent of the user is obtained at effective timings. This results in ensuring the safety of the user more certainly.

The electronic apparatus further includes a cable interface,
when the mode controller maintains the endurance mode in response to the consent being input, the mode controller periodically determines, while the surface temperature is greater than the first upper limit and is equal to or less than the second upper limit, whether a cable is inserted into the cable interface,
when the cable is inserted, the mode controller maintains the endurance mode, and
when the cable is not inserted, the mode controller turns off the endurance mode.

This results in providing the user-friendliness without the hassle of a user periodically consenting multiple times, and in maintaining the endurance mode only when there is a good possibility that the electronic apparatus will be used out of contact with a human body. This results in achieving a high degree of safety.

When the surface temperature exceeds the first upper limit in a state in which the endurance mode is on, the mode controller keeps outputting an alert icon, and outputs an alert message when the alert icon is operated.

This results in often causing dangers to be well known and taught to a user at effective timings, and thus in ensuring the safety of the user more certainly.

When the surface temperature falls to or below the first upper limit in the state in which the endurance mode is on, the mode controller hides the alert icon.

Consequently, the alert icon keeps being displayed on a home screen while the surface temperature is in the temperature range of low-temperature burn. This results in further often causing dangers to be well known and taught to a user at effective timings, and thus in ensuring the safety of the user more certainly.

In a state in which the endurance mode is on, the mode controller keeps outputting an explanation message until the surface temperature falls to or below the first upper limit, the explanation message being a message that explains about the endurance mode.

This results in causing potential dangers to be well known and taught to a user, and thus in ensuring the safety of the user more certainly, without the surface temperature reaching the lower limit of the temperature range of low-temperature burn.

When the surface temperature exceeds the second upper limit in a state in which the endurance mode is on, the mode controller restarts the electronic apparatus and turns off the endurance mode.

This makes it possible to ensure the safety of a user more certainly.

The electronic apparatus is a mobile device.

Mobile devices are general-purpose devices used by a very large number of end users. Most of the users are not aware that a surface temperature of the electronic apparatus could be increased to a temperature that causes a low-temperature burn. In other words, most of the users are not aware of potential dangers of the electronic apparatus. Thus, in the present embodiment, dangers are often caused to be well known and taught to a user and a consent of the user is obtained at effective timings when the surface temperature is increased to a temperature in the temperature range of low-temperature burn. This results in ensuring the safety of the user more certainly.

A mode control program according to an embodiment of the present disclosure operates a control circuit of an electronic apparatus as a mode controller,
the electronic apparatus including a temperature sensor that detects a temperature of a specified portion of the electronic apparatus,
the mode controller turning on an endurance mode that is a mode that permits a surface temperature of the electronic apparatus to be increased to a second upper limit when the electronic apparatus is used out of contact with a human body, the surface temperature being calculated on the basis of the temperature detected by the temperature sensor, the second upper limit being higher than a first upper limit that is an upper limit of a temperature in a normal mode.

Advantageous Effects of Invention

The present disclosure makes it possible to achieve the high performance of an electronic apparatus and ensure the safety of a user at the same time.

Note that the effect described here is not necessarily limitative, and any of the effects described in the present disclosure may be provided.

MODE(S) FOR CARRYING OUT THE INVENTION

Embodiments according to the present disclosure will now be described below with reference to the drawings.

I. First Embodiment

1. Hardware Configuration of Electronic Apparatus

Figure 1:
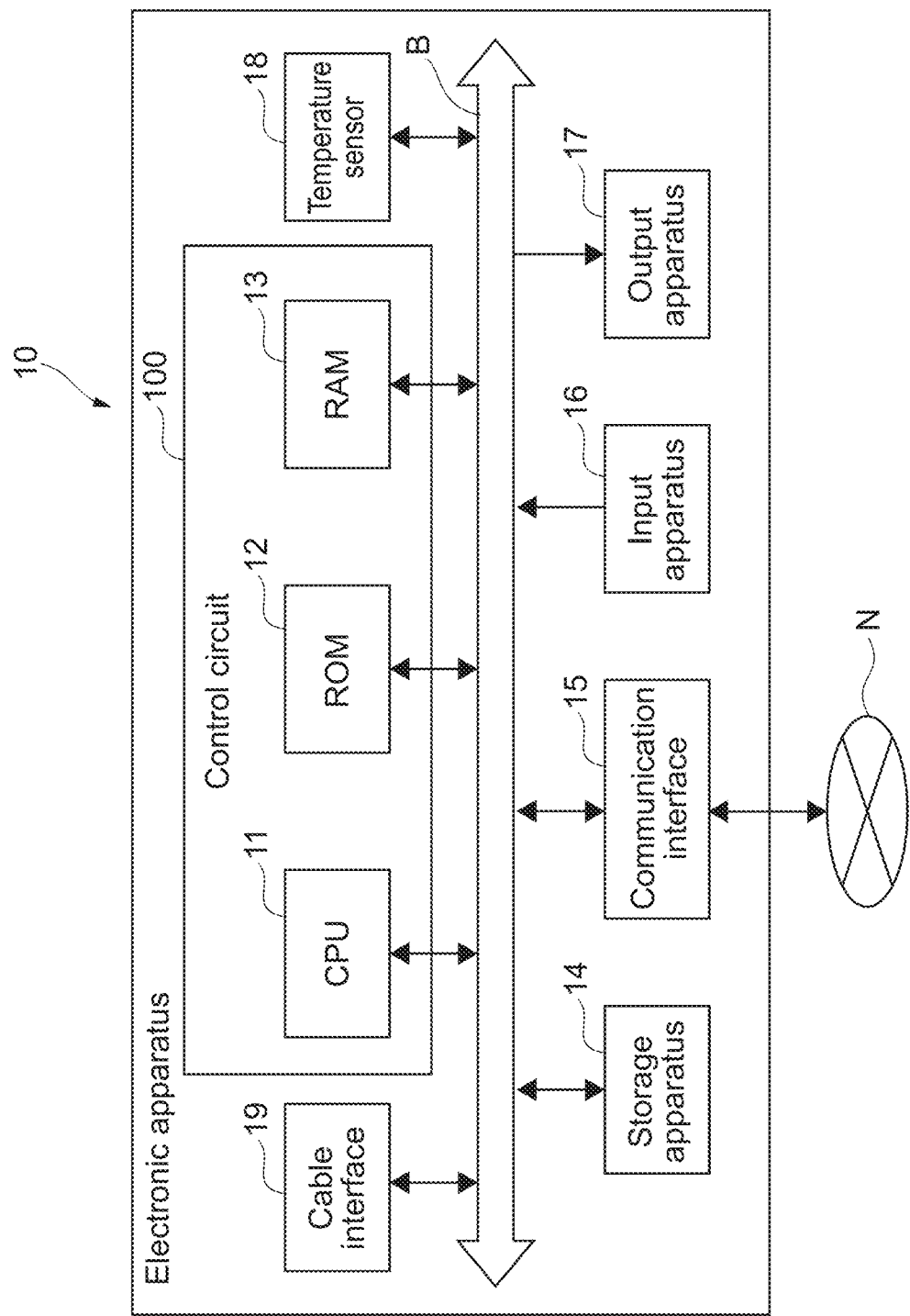
FIG. 1 illustrates a hardware configuration of an electronic apparatus according to a first embodiment of the present disclosure.

FIG. 1 illustrates a hardware configuration of an electronic apparatus according to a first embodiment of the present disclosure.

Typically, an electronic apparatus 10 is a mobile device such as a smartphone or a tablet computer. More specifically, the electronic apparatus 10 is a device that is expected to be used in contact with a human body (including a state of being in contact with a human body through clothes). For example, the electronic apparatus 10 is used by being held by a user with his/her hand, or is used by being put in a pocket of clothes worn by a user (for example, when a tethering function is performed).

The electronic apparatus 10 includes a control circuit 100, a storage apparatus 14, a communication interface 15, an input apparatus 16, an output apparatus 17, a temperature sensor 18, a cable interface 19, and a bus B through which these components are connected to each other.

The control circuit 100 is a system on a chip (SoC) that includes a central processing unit (CPU) 11, a read only memory (ROM) 12, and a random access memory (RAM) 13. The CPU 11 loads, into the RAM 13, an information processing program stored in the ROM 12, and executes the program. The ROM 12 fixedly stores therein, for example, a program executed by the CPU 11 and data. The ROM 12 is an example of a non-transitory computer-readable recording medium. The control circuit 100 further includes, for example, a dedicated hardware circuit and a graphics processing unit (GPU) (not illustrated).

The storage apparatus 14 includes a large-capacity nonvolatile recording medium such as (a solid-state drive).

The input apparatus 16 includes, for example, a touch panel and various switches. The input apparatus 16 detects an operation performed by a user and outputs the detected operation to the CPU 11. The input apparatus 16 may further include a sound input apparatus such as a microphone.

The output apparatus 17 includes, for example, an LCD or an organic EL display that is integrated with the touch panel. The output apparatus 17 performs computation processing on the basis of information received from the control circuit 100, and displays a generated image signal on a screen. The output apparatus 17 may further include a sound output apparatus such as a speaker.

The communication interface 15 is an interface used to establish connection with a network N such as the Internet.

The temperature sensor 18 detects a temperature of a specified portion of the electronic apparatus 10. Typically, the temperature sensor 18 detects a temperature of a portion of which the temperature is becomes high. For example, the temperature sensor 18 detects a temperature of the control circuit 100. A single temperature sensor 18 or a plurality of temperature sensors 18 may be provided.

A USB cable is inserted into the cable interface 19, or an HDMI (registered trademark) cable, an optical cable, a LAN cable, and a DVI cable are inserted into the cable interface 19. For example, a USB cable is inserted into the cable interface 19, and the electronic apparatus 10 is connected to a personal computer (not illustrated). The electronic apparatus 10 connects the personal computer to the network N through, for example, 5G communication using tethering, the personal computer being connected through the USB cable. Further, an HDMI (registered trademark) cable, an optical cable, a LAN cable, and a DVI cable are inserted into the cable interface 19, and the electronic apparatus 10 is connected to a video camera (not illustrated). The electronic apparatus 10 keeps displaying a moving image captured by the video camera on the output apparatus 17 (a display) in real time.

2. Functional Configuration of Electronic Apparatus

Figure 2:
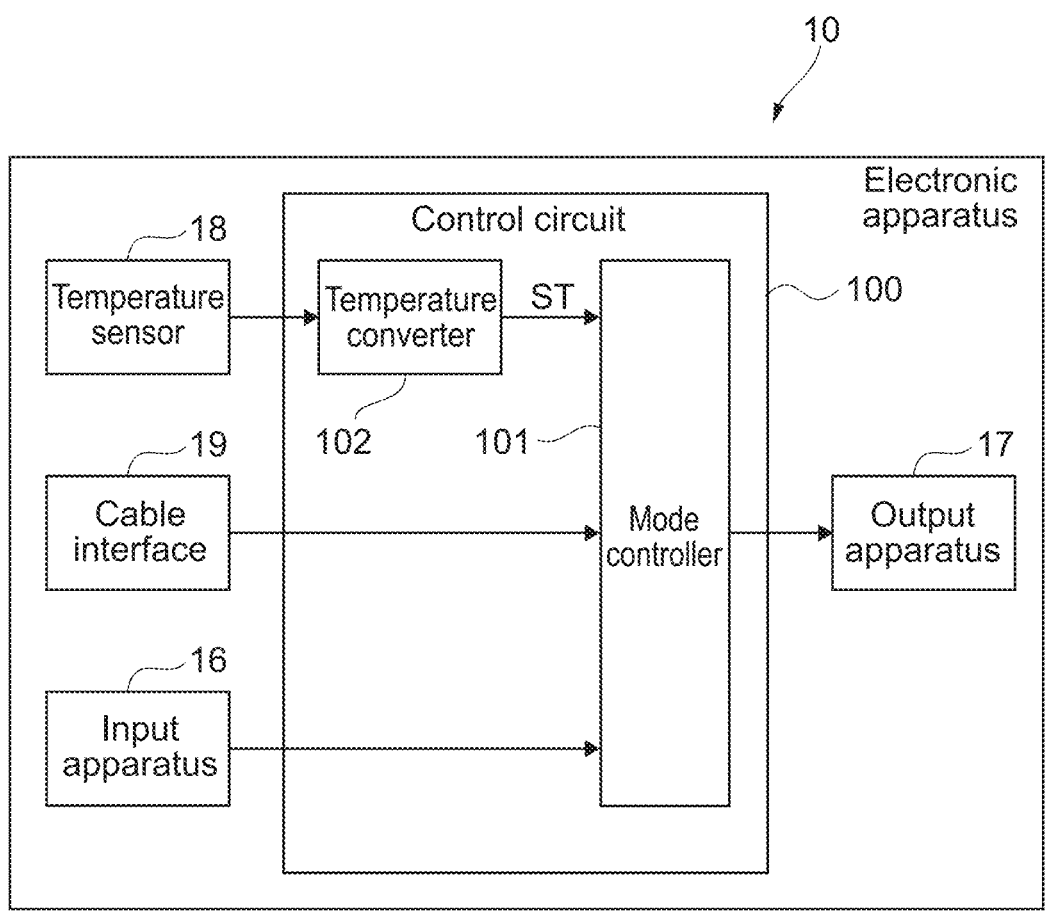
FIG. 2 illustrates a functional configuration of the electronic apparatus.

FIG. 2 illustrates a functional configuration of the electronic apparatus.

The control circuit 100 executes a mode control program to operate as a mode controller 101.

The control circuit 100 further operates as a temperature converter 102.

During the operation of the electronic apparatus 10, the temperature converter 102 periodically (for example, every few seconds) acquires a temperature of a specified portion (for example, the control circuit 100) of the electronic apparatus 10, the temperature of the specified portion being detected by the temperature sensor 18. The temperature converter 102 periodically calculates a surface temperature ST on the basis of the acquired temperature of the specified portion (that is, the temperature converter 102 periodically converts the temperature of the specified portion into the surface temperature ST). The temperature converter 102 periodically outputs the calculated surface temperature ST (that is, an estimated surface temperature ST) to the mode controller 101.

The mode controller 101 performs the following operation flow (FIG. 3) to turn on and off the endurance mode. The "endurance mode" is a mode that permits the surface temperature ST of the electronic apparatus 10 to be increased to a temperature in (or an upper limit Tmax of) a temperature range of low-temperature burn. Specifically, a state in which the endurance mode is on refers to a state in which (the control circuit 100 of) the electronic apparatus 10 is controlled (relaxing is performed) such that an upper limit of the surface temperature ST of the electronic apparatus 10 is equal to or less than the upper limit Tmax of the temperature range of low-temperature burn. In other words, if the endurance mode is off, the surface temperature ST will not exceed in principle the upper limit Tmax of the temperature range of low-temperature burn.

The surface temperature ST of the electronic apparatus 10 is classified into three temperature ranges (a safe temperature range, the temperature range of low-temperature burn, and a temperature range of high-temperature burn), and the three temperature ranges are used in the following description. The temperature range of low-temperature burn is a range of a temperature that causes a low-temperature burn. The safe temperature range is a range of a temperature that is equal to or less than an upper limit Tmin of the safe temperature range (a first upper limit), and is a range of a temperature that will be unlikely to cause the low-temperature burn even if a human body remains in contact with the surface of the electronic apparatus 10 for a long time. The temperature range of low-temperature burn is a range of a temperature that is greater than the upper limit Tmin of the safe temperature range (the first upper limit) and is equal to or less than the upper limit Tmax (a second upper limit). The temperature range of low-temperature burn is a range of a temperature that could cause the low-temperature burn if a human body remains in contact with the surface of the electronic apparatus 10 for about five to ten minutes. The temperature range of high-temperature burn is a range of a temperature that is greater than the upper limit Tmax of the temperature range of low-temperature burn (the second upper limit) (Tmim<Tmax), and is a range of a temperature that could cause a burn at a high temperature if a human body remains in contact with the surface of the electronic apparatus 10 for about less than a minute.

For example, it is sufficient if the upper limit Tmin of the safe temperature range (the first upper limit) is defined in a range of a safe temperature (for example, from 45° C. to 51° C.) that will be unlikely to cause the low-temperature burn even if a human body remains in contact with the surface of the electronic apparatus 10 for about five to ten minutes. It is sufficient if the upper limit Tmax of the temperature range of low-temperature burn (the second upper limit) is defined in a range of a temperature (for example, from 55° C. to 61° C.) that could cause a burn at a high temperature if a human body remains in contact with the surface of the electronic apparatus 10 for about less than a minute and is not acceptable in light of safety. It is sufficient if the temperature range of low-temperature burn is defined according to, for example, a material of the surface of the electronic apparatus 10 and a time of contact of a human body with the surface of the electronic apparatus 10, on the basis of, for example, ISO 13732-1 "Ergonomics of the thermal environment—Methods for the assessment of human responses to contact with surfaces".

Depending on the function performed by the electronic apparatus 10, the surface temperature ST may be increased to a temperature that is higher than normal. Specific examples of such a function include 5G communication that is performed through a USB cable using tethering, and real-time display of a high-quality moving image that is received through an HDMI (registered trademark) cable, an optical cable, a LAN cable, a DVI cable (only the "HDMI (registered trademark) cable" may be hereinafter simply described representatively). As an example of a function of 5G communication using tethering, the electronic apparatus 10 connects a personal computer to the network N through, for example, 5G communication using tethering, the personal computer being connected to the electronic apparatus 10 through a USB cable that is inserted into the cable interface 19. As an example of a function of receiving and displaying a high-quality moving image, the electronic apparatus 10 keeps displaying a moving image captured by a video camera on the output apparatus 17 (a display) in real time, the video camera being connected to the electronic apparatus 10 through an HDMI (registered trademark) cable, an optical cable, a LAN cable, and a DVI cable that are inserted into the cable interface 19.

In the use of these functions, the electronic apparatus 10 may be used out of contact with a human body. For example, in the case of the tethering function, a user operates a personal computer, and thus the user is out of contact with the electronic apparatus 10. Further, in the case of the display of a high-quality moving image, the electronic apparatus 10 is placed in a holder that is fixed to a video camera, and a display of the electronic apparatus 10 is used as a monitor. Especially in video creation, mobile devices (the electronic apparatuses 10) such as smartphones or tablet computers may be connected to a high-performance video camera for professional use, and may be used as monitors respectively used by a large number of staff members to check a captured moving image.

On the other hand, electronic apparatuses that are mobile devices such as smartphones or tablet computers are general-purpose devices used by a very large number of end users. Further, the mobile device is expected to be used in contact with a human body (including a state of being in contact with a human body through clothes). For example, the mobile device is used by being held by a user with his/her hand, or is used by being put in a pocket of clothes worn by a user (for example, when a tethering function is performed). Thus, most of the users are not aware that a surface temperature of the electronic apparatus could be increased to a temperature that causes a low-temperature burn. In other words, most of the users are not aware of potential dangers of the electronic apparatus. It is also conceivable that a sticker could be attached to the electronic apparatus in order to cause the dangers to be well known and taught. However, it is difficult to sufficiently teach all users the dangers using a sticker. Thus, typically, when the electronic apparatus performs a function that could increase the surface temperature of the electronic apparatus to a temperature that is higher than normal, as described above, an upper limit of the surface temperature of the electronic apparatus is controlled (relaxed) to the extent that a user is unlikely to get burned (corresponding to a safe temperature range of the present embodiment), in order to ensure the safety of all users. Typically, the performance of the electronic apparatus is reduced (for example, an upper limit of a clock of the control circuit is lowered) to perform control (relaxing) such that the surface temperature of the electronic apparatus does not exceed the upper limit. This may result in the specifications necessary for the electronic apparatus not being satisfied.

In view of the circumstances described above, according to the present embodiment, the mode controller 101 permits the surface temperature ST of the electronic apparatus 10 to be increased to a temperature in (or an upper limit of) the temperature range of low-temperature burn (the endurance mode) when the electronic apparatus 10 is used out of contact with a human body. This results in maintaining (not reducing) a level of performance of the electronic apparatus 10. In addition, in order to respond to the possibility that the electronic apparatuses 10 will be used by a larger number of staff members and to respond to a difference between users in a level of awareness of dangers, the dangers are often caused to be well known and taught to a user and a consent of the user is obtained at effective timings when the surface temperature ST is increased to a temperature in the temperature range of low-temperature burn. This results in ensuring the safety of the user more certainly.

Figure 3:
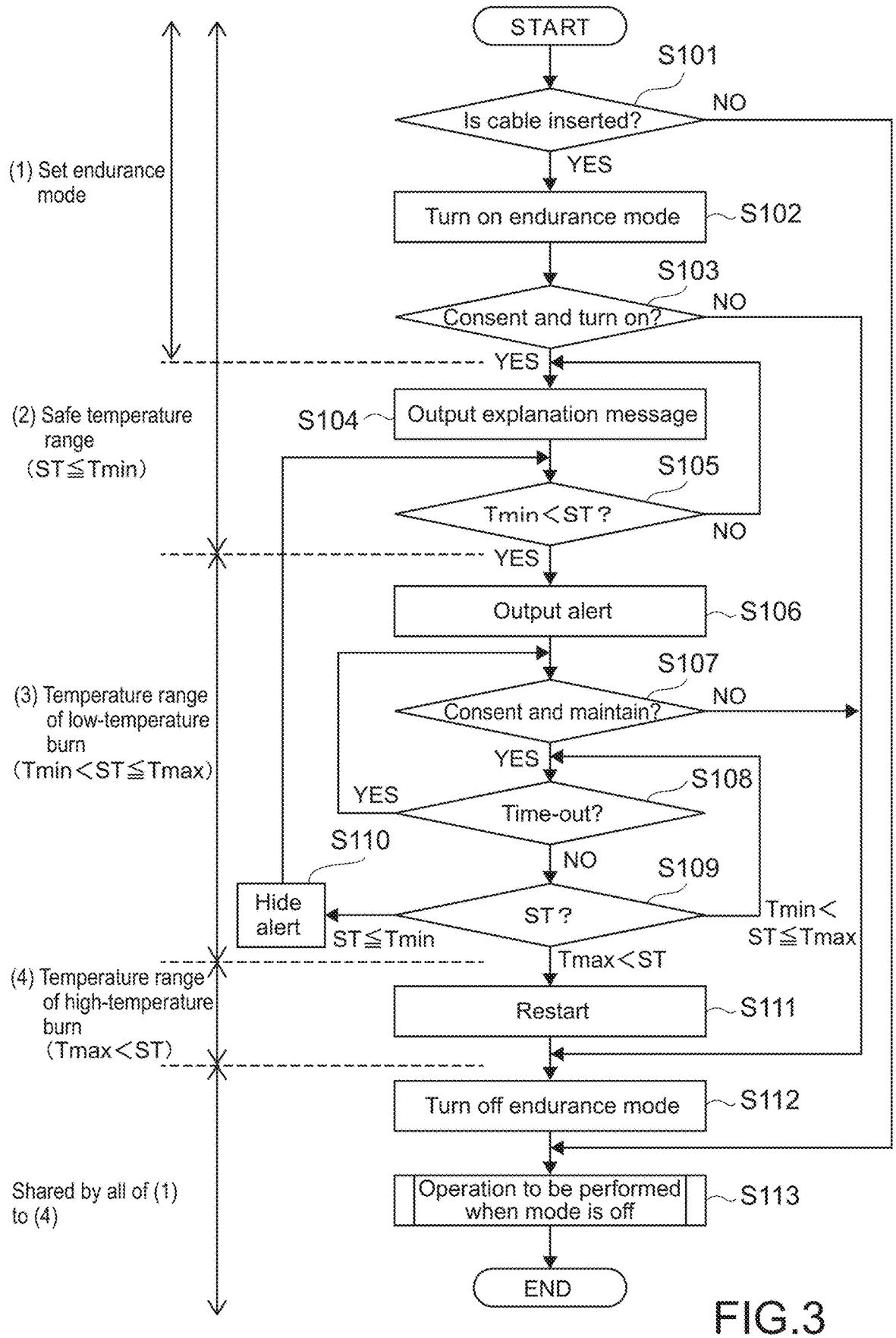
FIG. 3 illustrates a flow of an operation of a mode controller.
Figure 4:
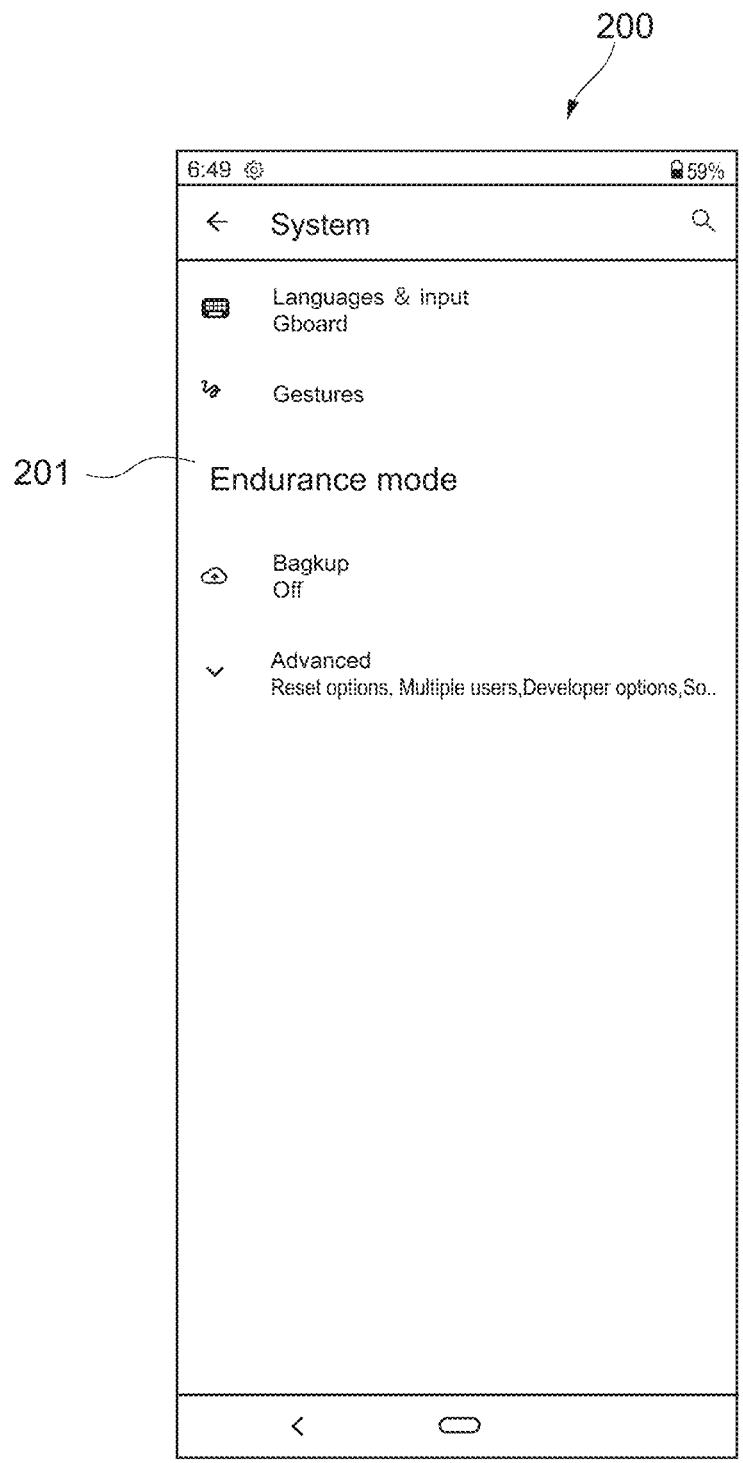
FIG. 4 illustrates an example of a screen used to turn on an endurance mode.
Figure 5:
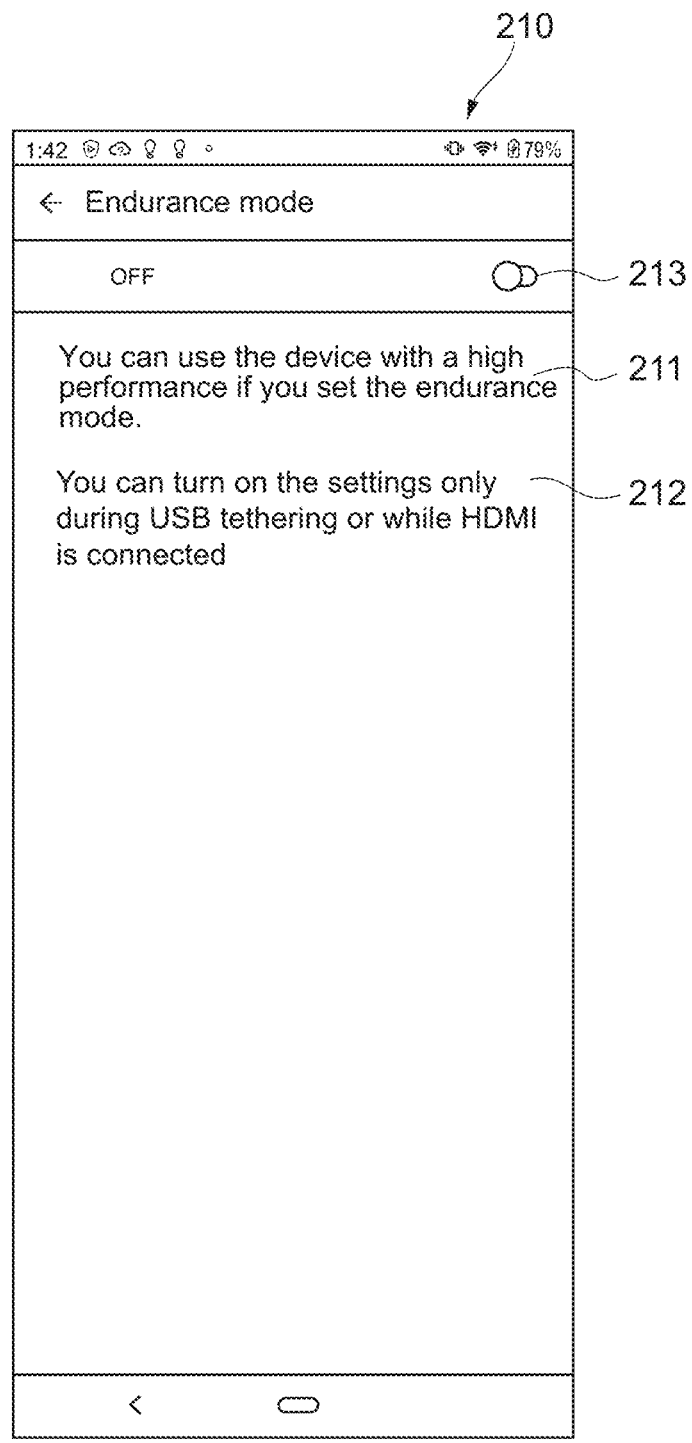
FIG. 5 illustrates an example of a screen used to turn on the endurance mode.

3. Flow of Operation of Mode Controller (1) Flow of Operation to be Performed when Endurance Mode is Set to be on FIG. 3 illustrates a flow of an operation of the mode controller. FIGS. 4 and 5 each illustrate an example of a screen used to turn on the endurance mode.

As a precondition for the operation, the endurance mode is off. Thus, the surface temperature ST of the electronic apparatus 10 is in the safe temperature range. A user tries to turn on the endurance mode by operating a touch panel. First, in order to turn on the endurance mode, the user selects an "endurance mode" menu 201 on a system setting screen 200 (FIG. 4). Then, an endurance mode setting screen 210 is displayed. A message 211 that indicates a definition of the endurance mode, a message 212 that indicates that the endurance mode can be used only during USB tethering or while HDMI (registered trademark) and the like are connected, and a slide button 213 are displayed on the endurance mode setting screen 210 (FIG. 5). The user operates the slide button 213 in order to turn on the endurance mode (FIG. 5).

The mode controller 101 determines whether a USB cable or an HDMI (registered trademark) cable is inserted into the cable interface 19 (Step S101). When the USB cable or the HDMI (registered trademark) cable is not inserted (Step S101, NO), the mode controller 101 determines that there is a possibility that the electronic apparatus 10 will be used in contact with a human body, and does not permit the endurance mode to be turned on. In this case, the mode controller 101 performs a flow of an operation that is to be performed when the endurance mode is off (described later) (Step S113).

On the other hand, when the USB cable or the HDMI (registered trademark) cable is inserted (Step S101, YES), the mode controller 101 determines that the electronic apparatus 10 is going to be used out of contact with a human body, and turns on the endurance mode (Step S102).

Note that, as a modification, the mode controller 101 may omit the determination (Step S101) of whether the USB cable or the HDMI (registered trademark) cable is inserted. In this case, when the mode controller 101 detects that a user has performed operation to turn on the slide button 213 (FIG. 5), the mode controller 101 turns on the endurance mode (Step S102).

Figure 6:
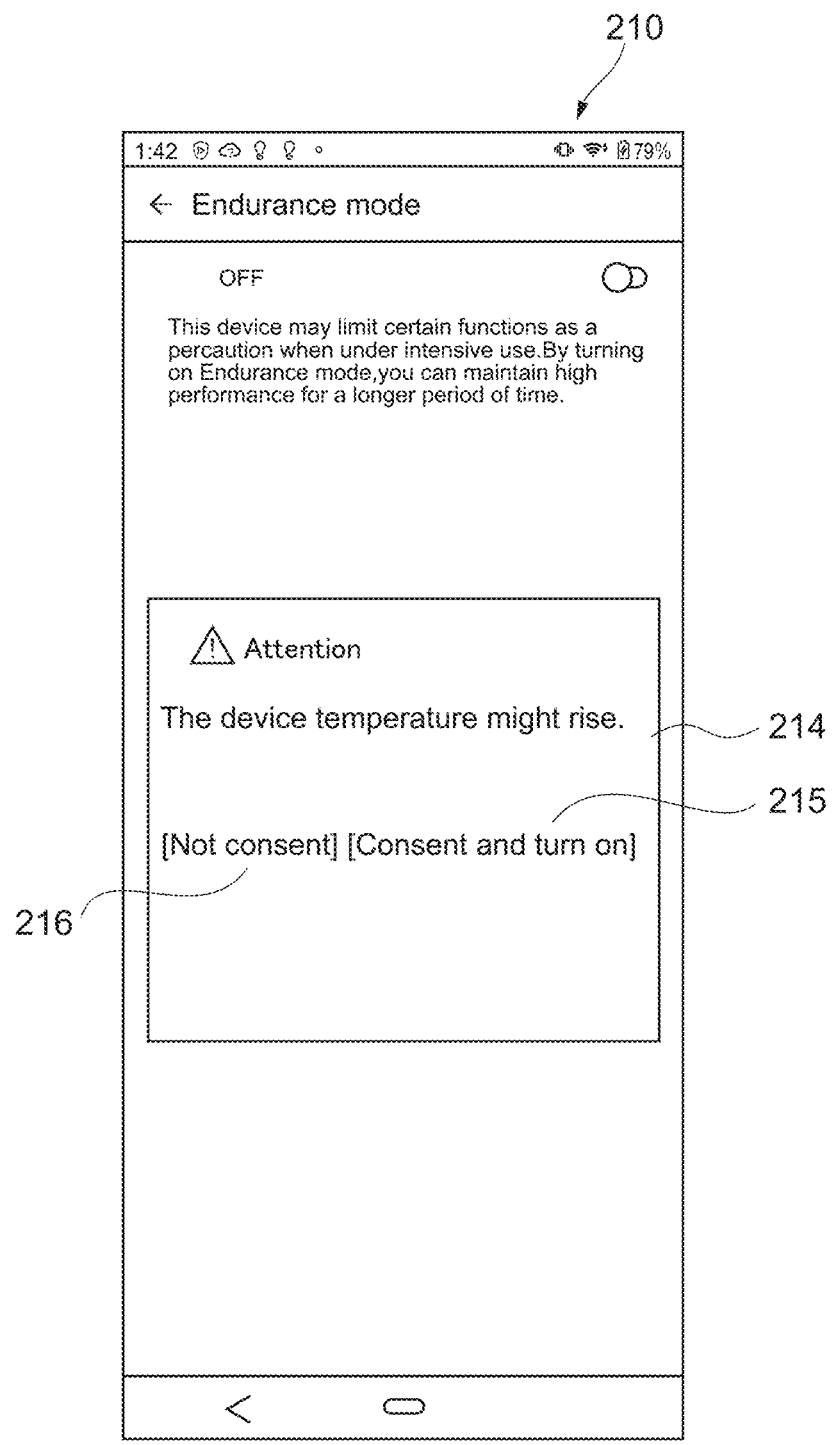
FIG. 6 illustrates an example of a screen having a start inquiry message.

FIG. 6 illustrates an example of a screen having a start inquiry message.

In response to turning on the endurance mode (Step S102), the mode controller 101 outputs a start inquiry message 214 to the endurance mode setting screen 210 (Step S103). The "start inquiry message" is a message used to inquire whether to consent to start the endurance mode. The user selects "Consent and turn on" 215 to input his/her consent, or selects "Not consent" 216.

When the consent is not input (selection of "Not consent" 216, or a time-out) (Step S103, NO), the mode controller 101 turns off the endurance mode (Step S112), and performs the flow of the operation that is to be performed when the endurance mode is off (described later) (Step S113).

(2) Flow of Operation Performed in Safe Temperature Range (ST≤Tmin)

On the other hand, when the consent is input (Step S103, YES), the mode controller 101 starts the endurance mode. At this point, the surface temperature ST of the electronic apparatus 10 is in the safe temperature range.

Figure 7:
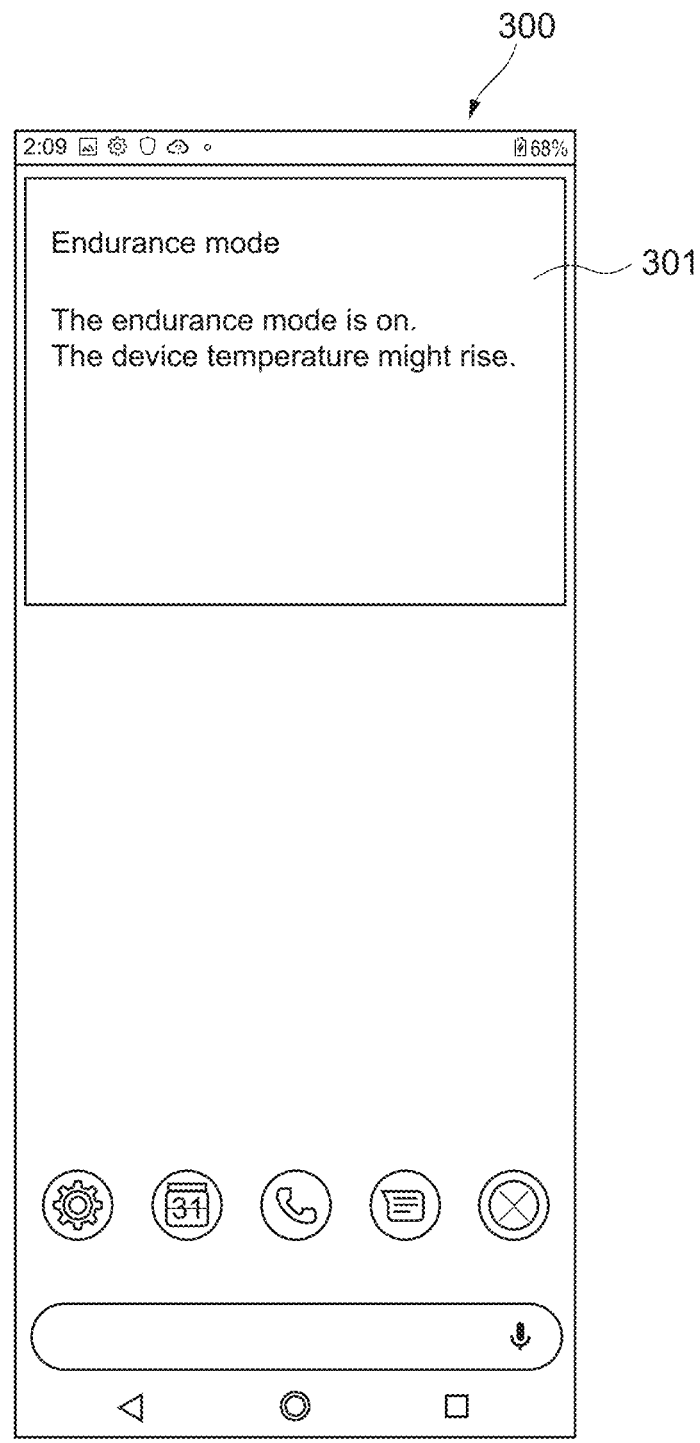
FIG. 7 illustrates an example of a screen having an explanation message.

FIG. 7 illustrates an example of a screen having an explanation message.

The mode controller 101 outputs an explanation message 301 to a home screen 300 (Step S104). The "explanation message" is a message that indicates that the endurance mode is on and explains about the endurance mode. In other words, the "explanation message" is a message that indicates that there is a possibility that the surface temperature ST of the electronic apparatus 10 will be increased to a temperature in the temperature range of low-temperature burn.

The mode controller 101 keeps periodically (for example, every few seconds) determining whether the surface temperature ST remains in the safe temperature range or has been changed to a temperature in the temperature range of low-temperature burn (Step S105). When the surface temperature ST is equal to or less than the upper limit Tmin of the safe temperature range (that is, when the surface temperature ST is in the safe temperature range) (Step S105, NO), the mode controller 101 keeps outputting the explanation message 301 to the home screen 300 (Step S104) until the surface temperature ST exceeds the upper limit Tmin of the safe temperature range.

(3) Flow of Operation Performed in Temperature Range of Low-Temperature Burn (Tmin<ST≤Tmax)

Figure 8:
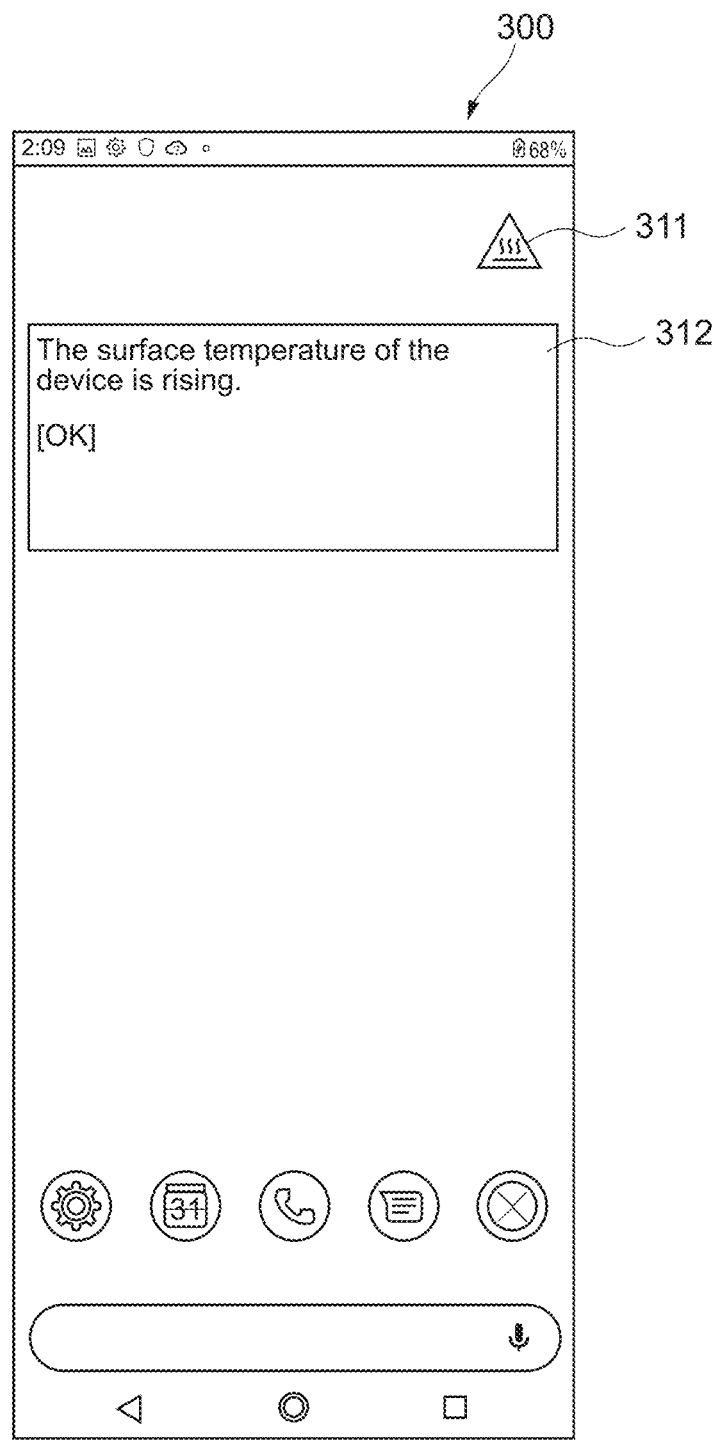
FIG. 8 illustrates an example of a screen having an alert icon and an alert message.

FIG. 8 illustrates an example of a screen having an alert icon and an alert message.

On the other hand, when the surface temperature ST exceeds the upper limit Tmin of the safe temperature range (Step S105, YES), the mode controller 101 outputs an alert icon 311 to the home screen 300 (Step S106). When the user operates the alert icon 311, the mode controller 101 outputs an alert message 312. The "alert message" is a message that alerts the user that the surface temperature ST of the electronic apparatus 10 has been increased to a temperature in the temperature range of low-temperature burn. Note that the mode controller 101 keeps displaying the alert icon 311 on the home screen 300 while the surface temperature ST is in the temperature range of low-temperature burn.

Figure 9:
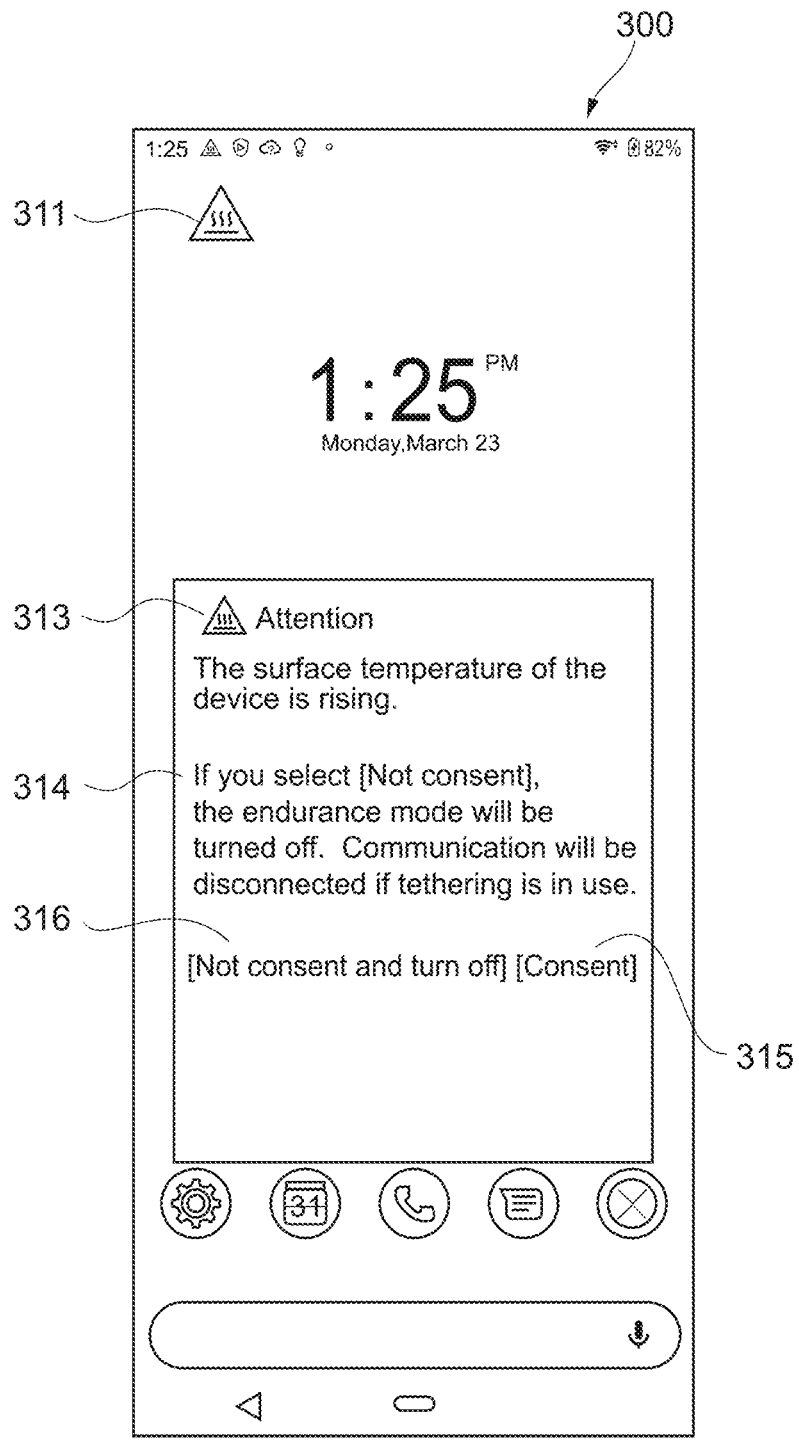
FIG. 9 illustrates an example of a screen having the alert message and a maintenance inquiry message.

FIG. 9 illustrates an example of a screen having the alert message and a maintenance inquiry message.

When the surface temperature ST exceeds the upper limit Tmin of the safe temperature range (Step S105, YES), the mode controller 101 further outputs an alert message 313 (that is similar to the alert message 312) and a maintenance inquiry message 314 to the home screen 300 (Step S107). The "maintenance inquiry message" is a message used to inquire whether to consent to maintain the endurance mode. The user selects "Consent" 315 to input his/her consent, or selects "Not consent and turn off" 316.

When the consent is not input (selection of "Not consent and turn off" 316, or a time-out) (Step S107, NO), the mode controller 101 turns off the endurance mode (Step S112), and performs the flow of the operation that is to be performed when the endurance mode is off (described later) (Step S113). The mode controller 101 terminates a function (such as 5G communication using USB tethering or display of a high-quality moving image using HDMI (registered trademark)) that could increase the surface temperature to a temperature that is higher than normal. Note that it is sufficient if the time length of a time-out is set to be a time (for example, for about one to five minutes) for which the low-temperature burn will be unlikely to be caused even if a human body remains in contact with the surface of the electronic apparatus 10. Note that exceptional specifications with which no time-out occurs when the electronic apparatus 10 performs a function (such as USB tethering) with which the electronic apparatus 10 is expected to be used by a user without being put in a pocket, may be adopted.

In addition, when the surface temperature ST has reached a specific temperature greater than the upper limit Tmin of the safe temperature range before the consent is input, the mode controller 101 also turns off the endurance mode (Step S112) and performs the flow of the operation that is to be performed when the endurance mode is off (described later) (Step S113). The mode controller 101 terminates a function (such as 5G communication using tethering or display of a high-quality moving image using HDMI (registered trademark)) that could increase the surface temperature to a temperature that is higher than normal. The "specific temperature" is a temperature that could cause a low-temperature burn for a contact time that is shorter than a contact time for which a low-temperature burn is caused when a human body remains in contact with the electronic apparatus 10 having a temperature that corresponds to the lower limit Tmin. For example, the "specific temperature" is a temperature that is about 3° C. higher than the upper limit Tmin of the safe temperature range.

Figure 10:
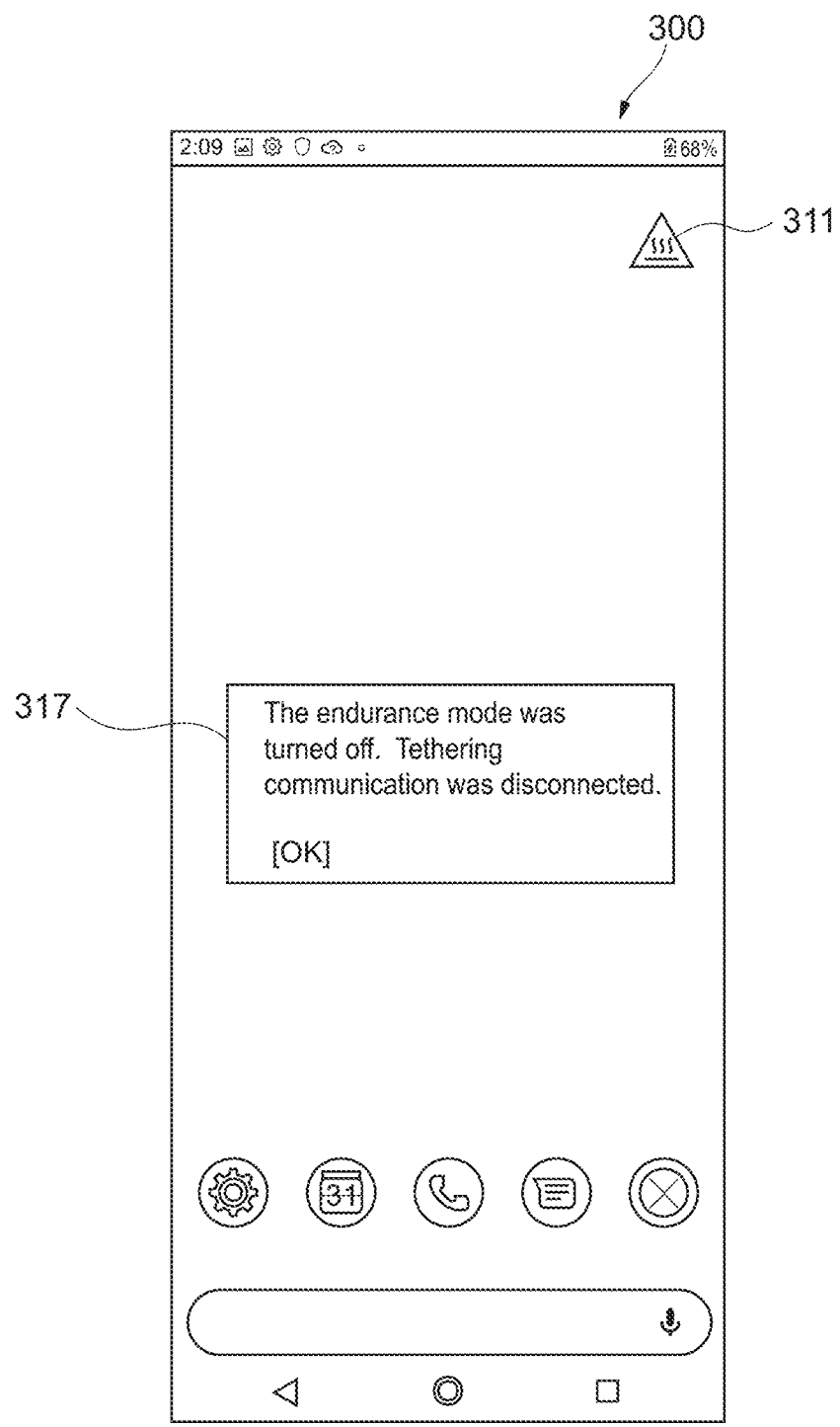
FIG. 10 illustrates an example of a screen having an endurance mode terminating message.
Figure 11:
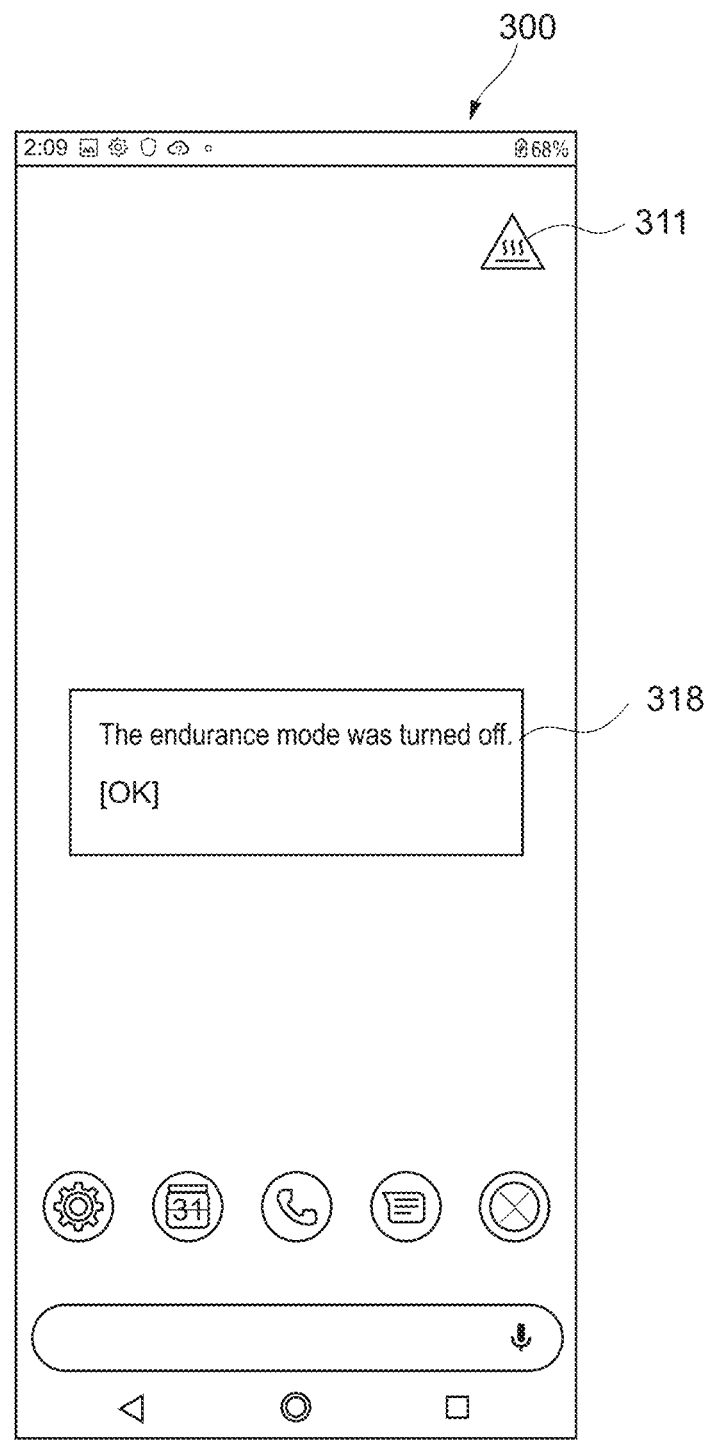
FIG. 11 illustrates an example of the screen having the endurance mode terminating message.

FIGS. 10 and 11 illustrate examples of a screen having an endurance mode terminating message.

When the mode controller 101 turns off the endurance mode (Step S112), the mode controller 101 outputs an endurance mode terminating message 317, 318 to the home screen 300. The "endurance mode terminating message" indicates that the endurance mode terminating message is turned off to be terminated. When the mode controller 101 terminates tethering communication through a USB cable, the mode controller 101 outputs the endurance mode terminating message 317 indicating this matter (FIG. 10). The alert icon 311 continues to be displayed when the mode controller 101 turns off the endurance mode, since the surface temperature ST remains greater than the upper limit Tmin of the safe temperature range.

On the other hand, when the consent is input (Step S107, YES), the mode controller 101 maintains the endurance mode. At this point, the surface temperature ST of the electronic apparatus 10 is in the temperature range of low-temperature burn. When the mode controller 101 maintains the endurance mode in response to the consent being input, the mode controller 101 periodically (Step S108, YES) outputs the maintenance inquiry message 314 (Step S107) while the surface temperature ST is in the temperature range of low-temperature burn (Tmin<ST≤Tmax) (on the right in Step S109). The mode controller 101 maintains the endurance mode when the consent is input, and turns off the endurance mode when the consent is not input. Note that it is sufficient if the interval at which the maintenance inquiry message 314 is periodically output is set to be a time (for example, for about one to five minutes) (Step S107) for which the low-temperature burn will be unlikely to be caused even if a human body remains in contact with the surface of the electronic apparatus 10. The reason is that, when the consent to the maintenance inquiry message 314 has been once input (Step S107, YES), this ensures for the present that a user is safely using the electronic apparatus 10 (is out of contact with the electronic apparatus 10), and thus there is a lesser need to frequently obtain the consent.

The mode controller 101 keeps periodically (for example, every few seconds) determining whether the surface temperature ST has been changed to a temperature in the safe temperature range, or remains in the temperature range of low-temperature burn, or has been changed to a temperature in the temperature range of high-temperature burn (Step S109, which is similar to Step S105). When the surface temperature ST falls to or below the upper limit Tmin of the safe temperature range (ST≤Tmin), this indicates that the surface temperature ST has been changed from a temperature in the temperature range of low-temperature burn to a temperature in the safe temperature range (on the left in Step S109). Then, the mode controller 101 hides (turns off) the alert icon 311 on the home screen 300 (Step S110). The mode controller 101 repeats the operation (of and after Step S105), which is to be performed when the surface temperature ST is in the safe temperature range.

(4) Flow of Operation Performed in Temperature Range of High-Temperature Burn (Tmax<ST)

When by any chance the surface temperature ST of the electronic apparatus 10 exceeds the upper limit Tmax of the temperature range of low-temperature burn (Tmax<ST), this indicates that the surface temperature ST has been changed from a temperature in the temperature range of low-temperature burn to a temperature in the temperature range of high-temperature burn (in a middle portion in Step S109). Then, the mode controller 101 restarts the electronic apparatus 10 (Step S111), turns off the endurance mode (Step S112), and performs the flow of the operation that is to be performed when the endurance mode is off (described later) (Step S113).

Figure 12:
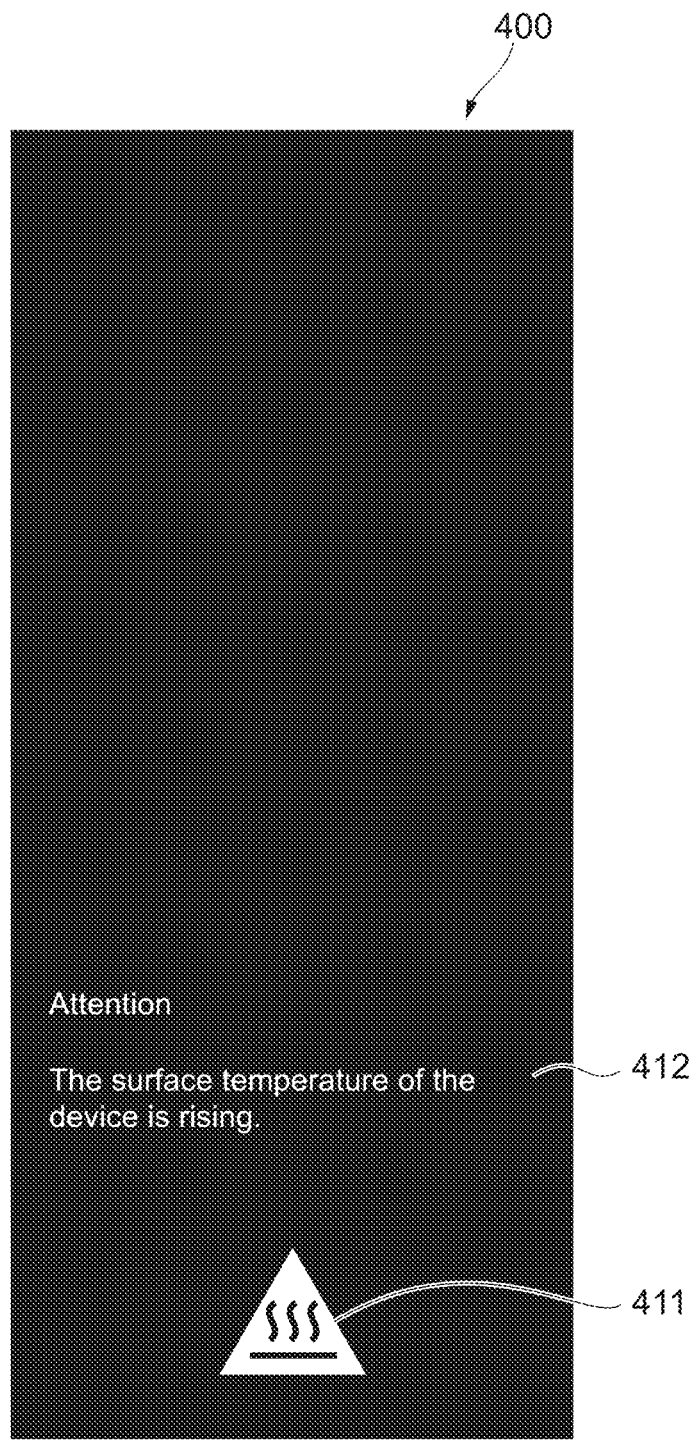
FIG. 12 illustrates an example of an ambient screen having an alert icon and an alert message.

FIG. 12 illustrates an example of an ambient screen having an alert icon and an alert message.

Especially during tethering communication, a display may be turned off when the surface temperature ST of the electronic apparatus 10 is in the temperature range of low-temperature burn. In this case, the mode controller 101 constantly displays an alert icon 411 and an alert message 412 (that are similar to the alert icon 311 and the alert message 312) on an ambient screen 400 (a black background).

(5) Flow of Operation to be Performed when Endurance Mode is Off (Step S113)

Figure 13:
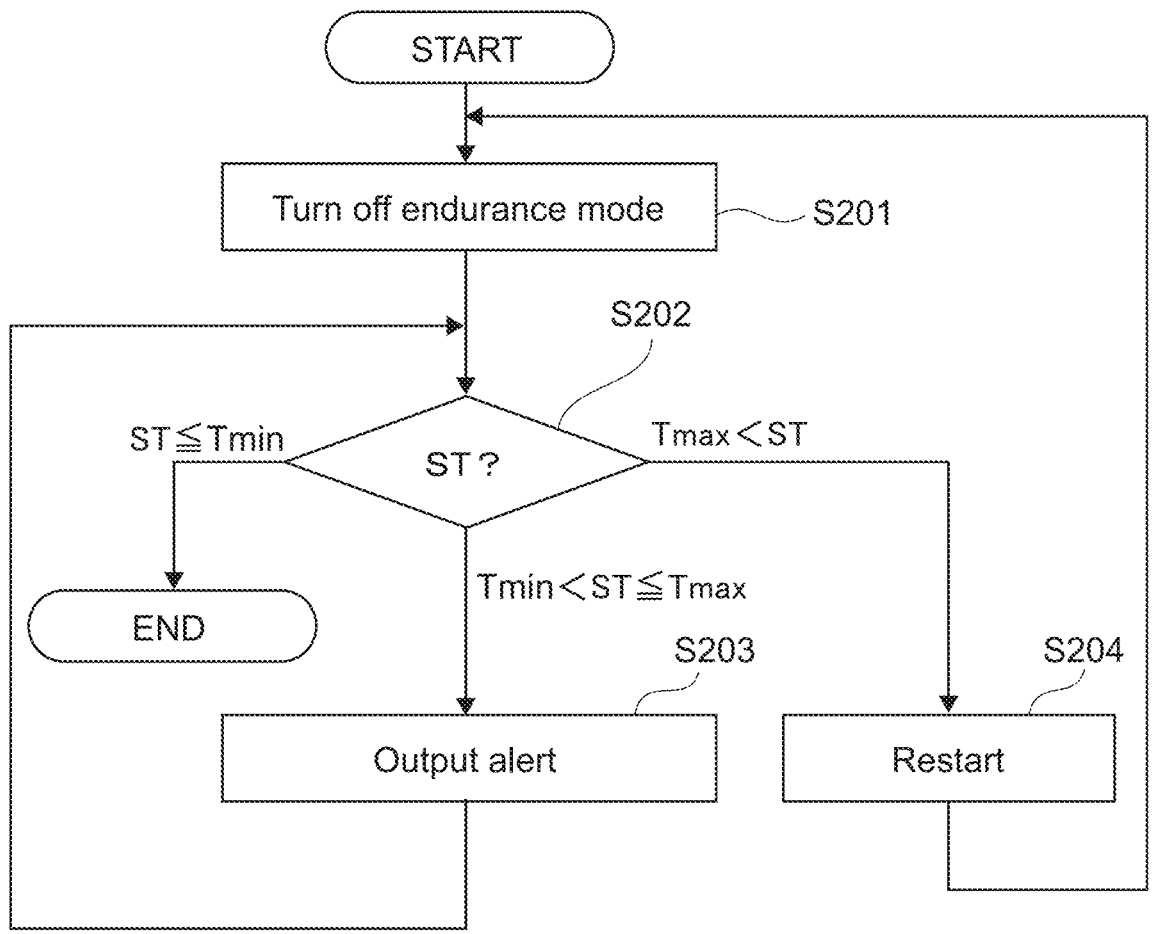
FIG. 13 illustrates the flow of the operation of the mode controller, which is to be performed when the endurance mode is off.

FIG. 13 illustrates the flow of the operation of the mode controller, which is to be performed when the endurance mode is off.

The mode controller 101 turns off the endurance mode (Step S201, which is similar to Step S112). A state in which the endurance mode is off refers to a state in which (the control circuit 100 of) the electronic apparatus 10 is controlled (relaxing is performed) such that the upper limit of the surface temperature ST of the electronic apparatus 10 is equal to or less than the upper limit Tmin of the safe temperature range (the first upper limit). In other words, if the endurance mode is off, the surface temperature ST will not exceed in principle the upper limit Tmin of the safe temperature range.

The mode controller 101 keeps periodically (for example, every few seconds) determining whether the surface temperature ST is in the safe temperature range, in the temperature range of low-temperature burn, or in the temperature range of high-temperature burn (Step S202, which is similar to Step S109). When the surface temperature ST is in the safe temperature range, the mode controller 101 does not perform special processing (on the left in Step S202).

When by any chance the surface temperature ST of the electronic apparatus 10 exceeds the upper limit Tmin of the safe temperature range (in a middle portion in Step S202), the mode controller 101 outputs the alert icon 311 to the home screen 300 (Step S203). Further, when the surface temperature ST exceeds the upper limit Tmax of the temperature range of low-temperature burn (that is, the surface temperature ST is in the temperature range of high-temperature burn) (on the right in Step S202), the mode controller 101 restarts the electronic apparatus (Step S204).

II. Second Embodiment

Hereinafter, descriptions and illustrations of a component and an operation that are similar to the component and operation described above are omitted, and the description and the illustration are given focused on a point different from that described above.

Figure 14:
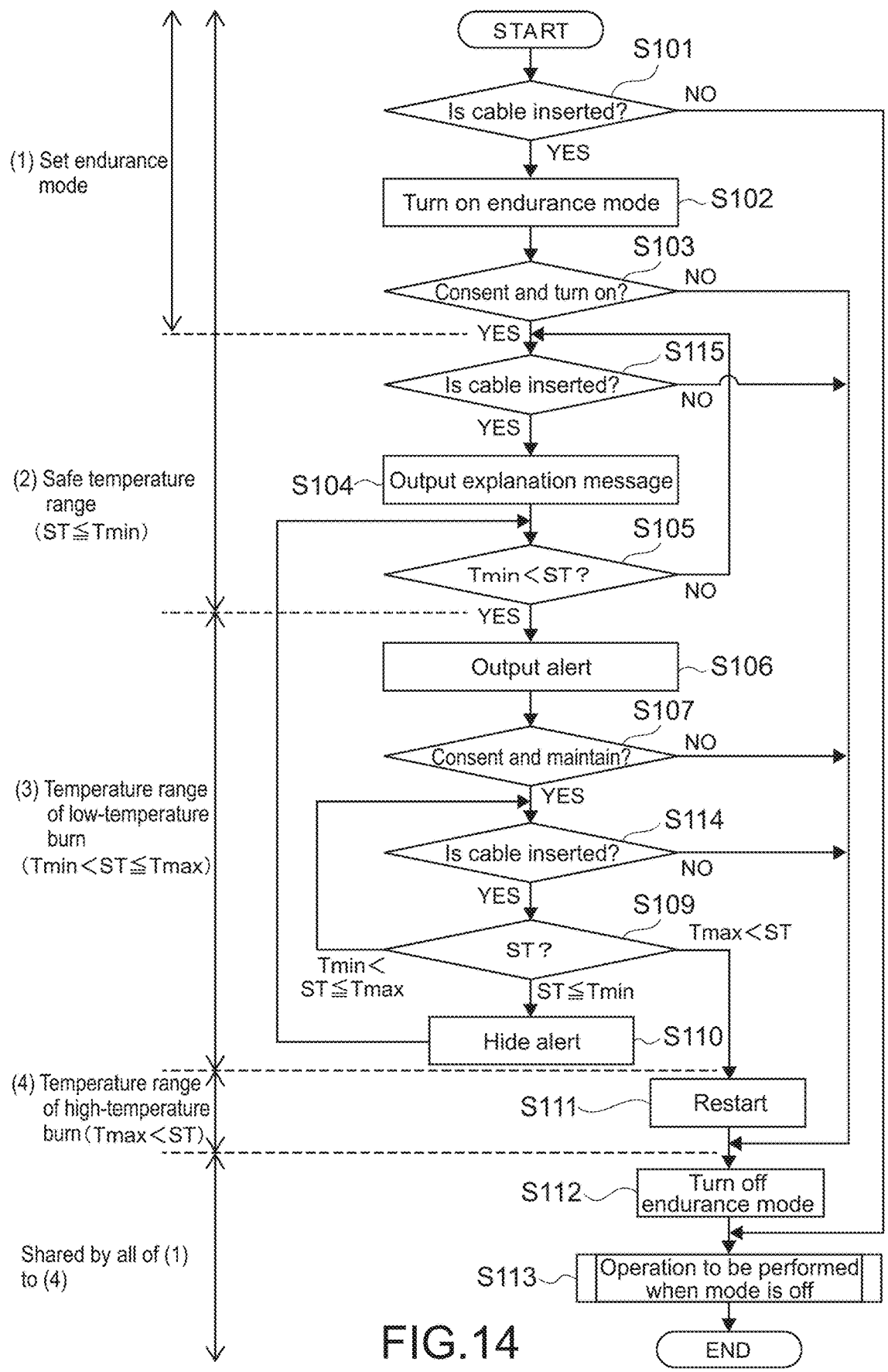
FIG. 14 illustrates the flow of the operation of the mode controller according to a second embodiment.

FIG. 14 illustrates the flow of the operation of the mode controller according to a second embodiment.

Operations of Steps S101 to S103 are similar to those in the first embodiments (Steps S101 to S103 in FIG. 3).

When the content to start the endurance mode is input (Step S103, YES), the mode controller 101 periodically determines, while the surface temperature ST is in the safe temperature range (Step S105, NO), whether a USB cable or an HDMI (registered trademark) cable is inserted into the cable interface 19 (Step S115). When the USB cable or the HDMI (registered trademark) cable is inserted, the mode controller 101 determines that the electronic apparatus 10 is going to be used out of contact with a human body, and starts the endurance mode (Step S115, YES).

On the other hand, when the USB cable or the HDMI (registered trademark) cable is not inserted (Step S115, NO), the mode controller 101 determines that there is a possibility that the electronic apparatus 10 will be used in contact with a human body, and turns off the endurance mode (Step S112). Then, the mode controller 101 performs the flow of the operation that is to be performed when the endurance mode is off (Step S113).

Operations of Steps S104 to S107 are similar to those in the first embodiments (Steps S104 to S107 in FIG. 3).

When the mode controller 101 maintains the endurance mode in response to the consent to maintain the endurance mode being input (Step S107, YES), the mode controller 101 periodically determines, while the surface temperature ST is in the temperature range of low-temperature burn (on the left in Step S109), whether the USB cable or the HDMI (registered trademark) cable is inserted into the cable interface 19 (Step S114). When the USB cable or the HDMI (registered trademark) cable is inserted, the mode controller 101 determines that the electronic apparatus 10 is going to be used out of contact with a human body, and maintains the endurance mode (Step S114, YES).

On the other hand, when the USB cable or the HDMI (registered trademark) cable is not inserted (Step S114, NO), the mode controller 101 determines that there is a possibility that the electronic apparatus 10 will be used in contact with a human body, and turns off the endurance mode (Step S112). Then, the mode controller 101 performs the flow of the operation that is to be performed when the endurance mode is off (Step S113).

As described above, the second embodiment results in there being no need to periodically (Step S108, YES) output the maintenance inquiry message 314 (Step S107), as in the first embodiment. Instead, it is determined whether a USB cable or an HDMI (registered trademark) cable is inserted into the cable interface 19 (Steps S115 and S114). When the USB cable or the HDMI (registered trademark) cable is not inserted, the endurance mode is turned off (Step S112). Thus, the second embodiment results in providing the user-friendliness without the hassle of a user periodically consenting multiple times, and in maintaining the endurance mode only when there is a good possibility that the electronic apparatus 10 will be used out of contact with a human body. This results in achieving a high degree of safety.

III. Third Embodiment

In the first embodiment, when the consent to the maintenance inquiry message 314 is not input (selection of "Not consent and turn off" 316, or a time-out) (Step S107, NO), the mode controller 101 turns off the endurance mode (Step S112), and terminates a function (such as 5G communication using USB tethering or display of a high-quality moving image using HDMI (registered trademark)) that could increase the surface temperature to a temperature that is higher than normal.

On the other hand, according to a third embodiment, in the case of a time-out for the maintenance inquiry message 314, the mode controller 101 maintains the endurance mode without user's content when tethering communication is performed through a USB cable.

As described above, according to the third embodiment, in the case of a time-out for the maintenance inquiry message 314, the endurance mode is maintained only when there is a good possibility that the electronic apparatus 10 will be used out of contact with a human body. This results in achieving a high degree of safety.

IV. Conclusion

Electronic apparatuses that are mobile devices such as smartphones or tablet computers are general-purpose devices used by a very large number of end users. Thus, most of the users are not aware that a surface temperature of the electronic apparatus could be increased to a temperature that causes a low-temperature burn. In other words, most of the users are not aware of potential dangers of the electronic apparatus. It is also conceivable that a sticker could be attached to the electronic apparatus in order to cause the dangers to be well known and taught. However, it is difficult to sufficiently teach all users the dangers using a sticker. Thus, typically, when the electronic apparatus performs a function that could increase the surface temperature of the electronic apparatus to a temperature that is higher than normal, as described above, an upper limit of the surface temperature of the electronic apparatus is controlled (re-laxed) to the extent that a user is unlikely to get burned (corresponding to a safe temperature range of the present embodiment), in order to ensure the safety of all users. Typically, the performance of the electronic apparatus is reduced (for example, an upper limit of a clock of the control circuit is lowered) to perform control (relaxing) such that the surface temperature of the electronic apparatus does not exceed the upper limit. This may result in the specifications necessary for the electronic apparatus not being satisfied.

(1) On the other hand, the electronic apparatus 10 according to the present embodiment includes the temperature sensor 18 detecting a temperature of a specified portion of the electronic apparatus 10, and the mode controller 101 turning on an endurance mode that is a mode that permits the surface temperature ST of the electronic apparatus 10 to be increased to a temperature in the temperature range of low-temperature burn when the electronic apparatus 10 is used out of contact with a human body, the surface temperature ST being calculated on the basis of the temperature detected by the temperature sensor 18, the temperature range of low-temperature burn being a range of a temperature that causes a low-temperature burn.

The present embodiment permits the surface temperature ST of the electronic apparatus 10 to be increased to a temperature in (or an upper limit of) the temperature range of low-temperature burn (the endurance mode) when the electronic apparatus 10 is used out of contact with a human body. This results in maintaining (not reducing) a level of performance of the electronic apparatus 10. This makes it possible to achieve the high performance of the electronic apparatus 10 and ensure the safety of a user at the same time.

(2) The electronic apparatus 10 further includes the cable interface 19, and when a USB cable or an HDMI (registered trademark) cable is inserted into the cable interface 19, the mode controller 101 determines that the electronic apparatus 10 is going to be used out of contact with a human body (Step S101, YES).

Depending on the function performed by the electronic apparatus 10, the surface temperature ST may be increased to a temperature that is higher than normal. Specific examples of such a function include 5G communication that is performed through a USB cable using tethering, and real-time display of a high-quality moving image that is received through an HDMI (registered trademark) cable. In the use of these functions, the electronic apparatus 10 may be used out of contact with a human body. For example, in the case of the tethering function, a user operates a personal computer, and thus the user is out of contact with the electronic apparatus 10. Further, in the case of the display of a high-quality moving image, the electronic apparatus 10 is placed in a holder that is fixed to a video camera, and a display of the electronic apparatus 10 is used as a monitor. As described above, when a function that could increase the surface temperature ST to a temperature that is higher than normal is performed in a state in which the electronic apparatus 10 is used out of contact with a human body, the endurance mode is turned on. This makes it possible to achieve the high performance of the electronic apparatus 10 and ensure the safety of a user at the same time.

(3) In response to turning on the endurance mode (Step S102), the mode controller 101 outputs the start inquiry message 214 (Step S103), where the start inquiry message 214 is a message used to inquire whether to consent to start the endurance mode. When the consent is input, the mode controller 101 starts the endurance mode (Step S103, YES), and when the consent is not input (Step S103, NO), the mode controller 101 turns off the endurance mode (Step S112).

A consent of a user is obtained at a timing of turning on the endurance mode, and this makes it possible to ensure the safety of the user more certainly.

(4) When the surface temperature ST exceeds the upper limit Tmin of the safe temperature range (Step S105, YES) in a state in which the endurance mode is on, the mode controller 101 outputs the maintenance inquiry message 314 (Step S107), where the maintenance inquiry message 314 is a message used to inquire whether to consent to maintain the endurance mode. When the consent is input, the mode controller 101 maintains the endurance mode (Step S107, YES), and when the consent is not input (Step S107, NO), the mode controller 101 turns off the endurance mode (Step S112).

A consent of a user is obtained at a timing at which the surface temperature ST exceeds the upper limit Tmin of the safe temperature range, and this makes it possible to ensure the safety of the user more certainly. Further, the endurance mode is turned off when the consent is not input (including the case of a time-out), and this makes it possible to ensure the safety of the user. Note that it is sufficient if the time length of a time-out is set to be a time (for example, for about one to five minutes) for which the low-temperature burn will be unlikely to be caused even if a human body remains in contact with the surface of the electronic apparatus 10. This makes it possible to prevent the user from getting burned by touching the electronic apparatus 10 without being aware that the surface temperature ST is increased to be in the temperature range of low-temperature burn before the user becomes aware of the maintenance inquiry message 314. For example, this prevents a low-temperature burn from being caused due to a user falling asleep (that is, falling asleep while doing something) during communication using USB tethering and keeping touching the electronic apparatus 10 for a long time in the same pose.

(5) When the surface temperature ST has reached, before the consent is input, a specific temperature greater than the upper limit Tmin of the safe temperature range (Step S107, NO) in a state in which the endurance mode is on, the mode controller 101 turns off the endurance mode (Step S112).

The "specific temperature" is a temperature that could cause a low-temperature burn for a contact time that is shorter than a contact time for which a low-temperature burn is caused when a human body remains in contact with the electronic apparatus 10 having a temperature that corresponds to the lower limit Tmin. A state in which the surface temperature ST has reached the specific temperature refers to a state in which the surface temperature ST has actually been increased to a temperature that could suddenly cause a low-temperature burn for a short contact time, even though a user still believes that the electronic apparatus 10 has a safe surface temperature. It is dangerous to touch the electronic apparatus 10 without being aware of such an increase in the surface temperature ST. Thus, the endurance mode is turned off when the surface temperature ST has reached the specific temperature, and this makes it possible to ensure the safety of the user.

(6) When the mode controller 101 maintains the endurance mode in response to the consent being input, the mode controller 101 periodically (Step S108, YES) outputs the maintenance inquiry message 314 (Step S107) while the surface temperature ST is in the temperature range of low-temperature burn. When the consent is input, the mode controller 101 maintains the endurance mode (Step S107, YES), and when the consent is not input (Step S107, NO), the mode controller 101 turns off the endurance mode (Step S112).

While the surface temperature ST is in the temperature range of low-temperature burn, dangers are often caused to be well known and taught to a user and a consent of the user is obtained at effective timings. This results in ensuring the safety of the user more certainly.

(7) The electronic apparatus 10 further includes the cable interface 19. When the mode controller 101 maintains the endurance mode in response to the consent being input, the mode controller 101 periodically determines, while the surface temperature ST is in the temperature range of low-temperature burn, whether a USB cable or an HDMI (registered trademark) cable is inserted into the cable interface 19 (Step S114). When the USB cable or the HDMI (registered trademark) cable is inserted, the mode controller 101 maintains the endurance mode (Step S114, YES), and when the USB cable or the HDMI (registered trademark) cable is not inserted (Step S114, NO), the mode controller 101 turns off the endurance mode (Step S112).

This results in providing the user-friendliness without the hassle of a user periodically consenting multiple times, and in maintaining the endurance mode only when there is a good possibility that the electronic apparatus 10 will be used out of contact with a human body. This results in achieving a high degree of safety.

(8) When the surface temperature ST exceeds the upper limit Tmin of the safe temperature range (Step S105, YES) in a state in which the endurance mode is on, the mode controller 101 keeps outputting the alert icon 311 (Step S106), and outputs the alert message 312 when the alert icon 311 is operated.

This results in often causing dangers to be well known and taught to a user at effective timings, and thus in ensuring the safety of the user more certainly.

(9) When the surface temperature ST falls to or below the upper limit Tmin of the safe temperature range in a state in which the endurance mode is on, the mode controller 101 hides the alert icon.

Consequently, the mode controller 101 keeps displaying the alert icon 311 on the home screen 300 while the surface temperature ST is in the temperature range of low-temperature burn. This results in further often causing dangers to be well known and taught to a user at effective timings, and thus in ensuring the safety of the user more certainly.

(10) In a state in which the endurance mode is on, the mode controller 101 keeps outputting the explanation message 301 (Step S104) until the surface temperature ST exceeds the upper limit Tmin of the safe temperature range, where the explanation message 301 is a message that explains about the endurance mode.

This results in keeping outputting a message that explains about the endurance mode, that is, a message that indicates that there is a possibility that the surface temperature ST of the electronic apparatus 10 will be increased to a temperature in the temperature range of low-temperature burn. This results in causing potential dangers to be well known and taught to a user, and thus in ensuring the safety of the user more certainly, without the surface temperature ST exceeding the upper limit Tmin of the safe temperature range.

(11) When the surface temperature ST exceeds a temperature in the temperature range of low-temperature burn in a state in which the endurance mode is on, the mode controller 101 restarts the electronic apparatus 10 (Step S111), and turns off the endurance mode (Step S112).

This makes it possible to ensure the safety of a user more certainly.

(12) The electronic apparatus 10 is a mobile device.

The electronic apparatus 10 that is a mobile device such as a smartphone or a tablet computer is a general-purpose device used by a very large number of end users. Thus, most of the users are not aware that a surface temperature of the electronic apparatus 10 could be increased to a temperature that causes a low-temperature burn. In other words, most of the users are not aware of potential dangers of the electronic apparatus 10. Thus, in the present embodiment, in order to respond to the possibility that the electronic apparatuses 10 will be used by a larger number of staff members and to respond to a difference between users in a level of awareness of dangers, the dangers are often caused to be well known and taught to a user and a consent of the user is obtained at effective timings when the surface temperature ST is increased to a temperature in the temperature range of low-temperature burn. This results in ensuring the safety of the user more certainly.

Note that the embodiments according to the present disclosure may take the following configurations.

(1) An electronic apparatus, including:
    a temperature sensor that detects a temperature of a specified portion of the electronic apparatus; and
    a mode controller that turns on an endurance mode that is a mode that permits a surface temperature of the electronic apparatus to be increased to a second upper limit when the electronic apparatus is used out of contact with a human body, the surface temperature being calculated on the basis of the temperature detected by the temperature sensor, the second upper limit being higher than a first upper limit that is an upper limit of a temperature in a normal mode.

(2) The electronic apparatus according to (1), further including a cable interface, in which
    when a cable is inserted into the cable interface, the mode controller determines that the electronic apparatus is going to be used out of contact with a human body.

(3) The electronic apparatus according to (1) or (2), in which
    in response to turning on the endurance mode, the mode controller outputs a start inquiry message that is a message used to inquire whether to consent to start the endurance mode,
    when the consent is input, the mode controller starts the endurance mode, and
    when the consent is not input, the mode controller turns off the endurance mode.

(4) The electronic apparatus according to any one of (1) to (3), in which
    when the surface temperature exceeds the first upper limit in a state in which the endurance mode is on, the mode controller outputs a maintenance inquiry message that is a message used to inquire whether to consent to maintain the endurance mode,
    when the consent is input, the mode controller maintains the endurance mode, and
    when the consent is not input, the mode controller turns off the endurance mode.

(5) The electronic apparatus according to (4), in which
    when the surface temperature has reached, before the consent is input, a specific temperature greater than the first upper limit in the state in which the endurance mode is on, the mode controller turns off the endurance mode.

(6) The electronic apparatus according to (4) or (5), in which
    when the mode controller maintains the endurance mode in response to the consent being input, the mode controller periodically outputs the maintenance inquiry message while the surface temperature is greater than the first upper limit and is equal to or less than the second upper limit,
    when the consent is input, the mode controller maintains the endurance mode, and
    when the consent is not input, the mode controller turns off the endurance mode.

(7) The electronic apparatus according to any one of (4) to (6), further including a cable interface, in which
    when the mode controller maintains the endurance mode in response to the consent being input, the mode controller periodically determines, while the surface temperature is greater than the first upper limit and is equal to or less than the second upper limit, whether a cable is inserted into the cable interface,
    when the cable is inserted, the mode controller maintains the endurance mode, and
    when the cable is not inserted, the mode controller turns off the endurance mode.

(8) The electronic apparatus according to any one of (1) to (7), in which
when the surface temperature exceeds the first upper limit in a state in which the endurance mode is on, the mode controller keeps outputting an alert icon, and outputs an alert message when the alert icon is operated.
(9) The electronic apparatus according to (8), in which
when the surface temperature falls to or below the first upper limit in the state in which the endurance mode is on, the mode controller hides the alert icon.
(10) The electronic apparatus according to any one of (1) to (9), in which
in a state in which the endurance mode is on, the mode controller keeps outputting an explanation message until the surface temperature falls to or below the first upper limit, the explanation message being a message that explains about the endurance mode.
(11) The electronic apparatus according to any one of (1) to (10), in which
when the surface temperature exceeds the second upper limit in a state in which the endurance mode is on, the mode controller restarts the electronic apparatus and turns off the endurance mode.
(12) The electronic apparatus according to any one of (1) to (11), in which
the electronic apparatus is a mobile device.
(13) A mode control program that operates a control circuit of an electronic apparatus as a mode controller,
the electronic apparatus including a temperature sensor that detects a temperature of a specified portion of the electronic apparatus,
the mode controller turning on an endurance mode that is a mode that permits a surface temperature of the electronic apparatus to be increased to a second upper limit when the electronic apparatus is used out of contact with a human body, the surface temperature being calculated on the basis of the temperature detected by the temperature sensor, the second upper limit being higher than a first upper limit that is an upper limit of a temperature in a normal mode.
(14) A non-transitory computer-readable recording medium that has stored therein a mode control program that operates a control circuit of an electronic apparatus as a mode controller,
the electronic apparatus including a temperature sensor that detects a temperature of a specified portion of the electronic apparatus,
the mode controller turning on an endurance mode that is a mode that permits a surface temperature of the electronic apparatus to be increased to a second upper limit when the electronic apparatus is used out of contact with a human body, the surface temperature being calculated on the basis of the temperature detected by the temperature sensor, the second upper limit being higher than a first upper limit that is an upper limit of a temperature in a normal mode.

The embodiments and the modifications of the present technology have been described above. Of course the present technology is not limited to the embodiments described above, and various modifications may be made thereto without departing from the scope of the present technology.

REFERENCE SIGNS LIST 10 electronic apparatus
11 CPU
12 ROM
13 RAM
14 storage apparatus
15 communication interface
16 input apparatus
17 output apparatus
18 temperature sensor
19 cable interface
100 control circuit
101 mode controller
102 temperature converter
200 system setting screen
201 menu
210 endurance mode setting screen
211 message
212 message
213 slide button
214 start inquiry message
300 home screen
301 explanation message
311 alert icon
312 alert message
313 alert message
314 maintenance inquiry message
317 endurance mode terminating message
400 ambient screen
411 alert icon
412 alert message

The invention claimed is:

1. An electronic apparatus, comprising:
a temperature sensor that detects a temperature of a specified portion of the electronic apparatus; and
a mode control circuit configured to
turn on an endurance mode that is a mode that permits a surface temperature of the electronic apparatus to be increased to a second upper limit when the electronic apparatus is used out of contact with a human body, the surface temperature being calculated on a basis of the temperature detected by the temperature sensor, the second upper limit being higher than a first upper limit that is an upper limit of a temperature in a normal mode, and
output an inquiry message that is a message used to inquire whether to consent to use the endurance mode in response to the endurance mode being on,
when the consent is input, the mode control circuit is configured to use the endurance mode, and
when the consent is not input, the mode control circuit is configured to turn off the endurance mode.

2. The electronic apparatus according to claim 1, further comprising a cable interface, wherein
when a cable is inserted into the cable interface, the mode control circuit is configured to determine that the electronic apparatus is going to be used out of contact with a human body.

3. The electronic apparatus according to claim 1, wherein
the mode control circuit is configured to output a start inquiry message as the inquiry message in response to the endurance mode being turned on, and
when the consent is input, the mode control circuit is configured to start the endurance mode.

4. The electronic apparatus according to claim 1, wherein
the mode control circuit is configured to output a maintenance inquiry message as the inquiry message in response to the surface temperature exceeding the first upper limit in a state in which the endurance mode is on, when the consent is input, the mode control circuit is configured to maintain the endurance mode, and
when the consent is not input, the mode control circuit is configured to turn off the endurance mode.

5. The electronic apparatus according to claim 4, wherein when the surface temperature has reached, before the consent is input, a specific temperature greater than the first upper limit in the state in which the endurance mode is on, the mode control circuit is configured to turn off the endurance mode.

6. The electronic apparatus according to claim 5, wherein when the mode control circuit is configured to maintain the endurance mode in response to the consent being input, the mode control circuit is configured to periodically output the maintenance inquiry message while the surface temperature is greater than the first upper limit and is equal to or less than the second upper limit,
when the consent is input, the mode control circuit is configured to maintain the endurance mode, and
when the consent is not input, the mode control circuit is configured to turn off the endurance mode.

7. The electronic apparatus according to claim 6, wherein when the mode control circuit is configured to maintain the endurance mode in response to the consent being input, the mode control circuit is configured to periodically determine, while the surface temperature is greater than the first upper limit and is equal to or less than the second upper limit, whether a cable is inserted into the cable interface,
when the cable is inserted, the control circuit is configured to maintain the endurance mode, and
when the cable is not inserted, the mode control circuit is configured to turn off the endurance mode.

8. The electronic apparatus according to claim 1, wherein when the surface temperature exceeds the first upper limit in a state in which the endurance mode is on, the mode control circuit is configured to keep outputting an alert icon, and output an alert message when the alert icon is operated.

9. The electronic apparatus according to claim 8, wherein when the surface temperature falls to or below the first upper limit in the state in which the endurance mode is on, the mode control circuit is configured to hide the alert icon.

10. The electronic apparatus according to claim 1, wherein
in a state in which the endurance mode is on, the mode control circuit is configured to keep outputting an explanation message until the surface temperature falls to or below the first upper limit, the explanation message being a message that explains about the endurance mode.

11. The electronic apparatus according to claim 1, wherein
when the surface temperature exceeds the second upper limit in a state in which the endurance mode is on, the mode control circuit is configured to restart the electronic apparatus and turn off the endurance mode.

12. The electronic apparatus according to claim 1, wherein the electronic apparatus is a mobile device.

13. A mode control program stored in a non-transitory computer readable storage device that, when executed by circuitry, cause the circuitry of an electronic apparatus including a temperature sensor that detects a temperature of a specified portion of the electronic apparatus, to:
turn on an endurance mode that is a mode that permits a surface temperature of the electronic apparatus to be increased to a second upper limit when the electronic apparatus is used out of contact with a human body, the surface temperature being calculated on a basis of the temperature detected by the temperature sensor, the second upper limit being higher than a first upper limit that is an upper limit of a temperature in a normal mode, and
output an inquiry message that is a message used to inquire whether to consent to use the endurance mode in response to the endurance mode being on,
when the consent is input, the mode control circuit is configured to use the endurance mode, and
when the consent is not input, the mode control circuit is configured to turn off the endurance mode.

14. The mode control program according to claim 13, wherein, in response to turning on the endurance mode, causes the circuitry to output a start inquiry message as an inquiry message,
when the consent is input, causes the circuitry to start the endurance mode, and
when the consent is not input, causes the circuitry to turn off the endurance mode.

15. The mode control program according to claim 13, wherein, in response to the surface temperature exceeding the first upper limit in a state in which the endurance mode is on, causes the circuitry to output a start inquiry message as an inquiry message,
when the consent is input, causes the circuitry to start the endurance mode, and
when the consent is not input, causes the circuitry to turn off the endurance mode.

16. The mode control program according to claim 15, wherein
when the surface temperature exceeds the second upper limit in a state in which the endurance mode is on, causes the circuitry to restart the electronic apparatus and turn off the endurance mode.

17. The mode control program according to claim 13, when the endurance mode is maintained in response to the consent being input, the circuitry is configured to periodically determine, while the surface temperature is greater than the first upper limit and is equal to or less than the second upper limit, whether a cable is inserted into the cable interface,
when the cable is inserted, the circuitry is configured to maintain the endurance mode, and
when the cable is not inserted, the circuitry is configured to turn off the endurance mode.

18. The mode control program according to claim 17, wherein
when the surface temperature exceeds the first upper limit in a state in which the endurance mode is on causes the circuitry to keep outputting an alert icon, and output an alert message when the alert icon is operated.

19. The mode control program according to claim 17, wherein
in a state in which the endurance mode is on, causes the circuitry to keep outputting an explanation message until the surface temperature falls to or below the first upper limit, the explanation message being a message that explains about the endurance mode.

20. A method of controlling a mode of an electronic apparatus including a temperature sensor that detects a temperature of a specified portion of the electronic apparatus, the method comprising:
turning on an endurance mode that is a mode that permits a surface temperature of the electronic apparatus to be increased to a second upper limit in response to the electronic apparatus being used out of contact with a human body, the surface temperature being calculated on a basis of the temperature detected by the temperature sensor, the second upper limit being higher than a first upper limit that is an upper limit of a temperature in a normal mode, and in response to the endurance mode being on, outputting an inquiry message that is a message used to inquire whether to consent to use the endurance mode, in response to the consent being input, using the endurance mode, and in response to the consent not being input, turning off the endurance mode.

* * * * *